(12) United States Patent
Mori et al.

(10) Patent No.: US 11,308,011 B2
(45) Date of Patent: Apr. 19, 2022

(54) SIGNAL COLLECTION METHOD AND SIGNAL COLLECTION DEVICE

(71) Applicant: SOCIONEXT INC., Kanagawa (JP)

(72) Inventors: Masataka Mori, Yokohama (JP); Hironori Tsuchiya, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/145,091

(22) Filed: Jan. 8, 2021

(65) Prior Publication Data
US 2021/0133097 A1 May 6, 2021

Related U.S. Application Data

(63) Continuation of application No. PCT/JP2018/026379, filed on Jul. 12, 2018.

(51) Int. Cl.
G06F 13/38 (2006.01)
G06F 11/34 (2006.01)

(52) U.S. Cl.
CPC .............. *G06F 13/38* (2013.01); *G06F 11/34* (2013.01)

(58) Field of Classification Search
CPC ..................... G06F 13/38; G06F 11/3466–349
USPC ........................................................ 710/305
See application file for complete search history.

(56) References Cited

U.S. PATENT DOCUMENTS

| 8,751,904 B2 * | 6/2014 | Wang ................. H03M 13/2918 714/773 |
| 10,268,382 B2 * | 4/2019 | Shung ................. G06F 12/0875 |
| 10,719,471 B2 * | 7/2020 | Kurokawa ............. G06F 3/0664 |
| 10,747,471 B2 * | 8/2020 | Wu ........................ G11C 16/10 |
| 2003/0131288 A1 | 7/2003 | Takahashi et al. |

FOREIGN PATENT DOCUMENTS

| JP | H05-061728 A | 3/1993 |
| JP | H07-036735 A | 2/1995 |
| JP | 2003-218872 A | 7/2003 |

OTHER PUBLICATIONS

International Search Report and Written Opinion dated Oct. 9, 2018 in International Patent Application No. PCT/JP2018/026379; with its Englsih translation.

* cited by examiner

*Primary Examiner* — Brian T Misiura
(74) *Attorney, Agent, or Firm* — McDermott Will & Emery LLP

(57) ABSTRACT

The signal collection method is a method that collects internal states indicated by signals in an electronic circuit device including a bus, the signal collection method including: storing the internal states with a fine resolution data storage by obtaining the internal states per a first period; per a second period, which is longer than the first period: obtaining a first data transfer amount, which is a data amount transferred by the bus, via a coarse resolution data storage; calculating a difference between a second data transfer amount and the first data transfer amount obtained in the obtaining, the second data transfer amount being calculated in advance and obtained from a cycle pattern generator; and determining whether the difference calculated in the calculating is within a predetermined range to stop storing in the storing when it is determined that the difference is not within the predetermined range.

15 Claims, 16 Drawing Sheets

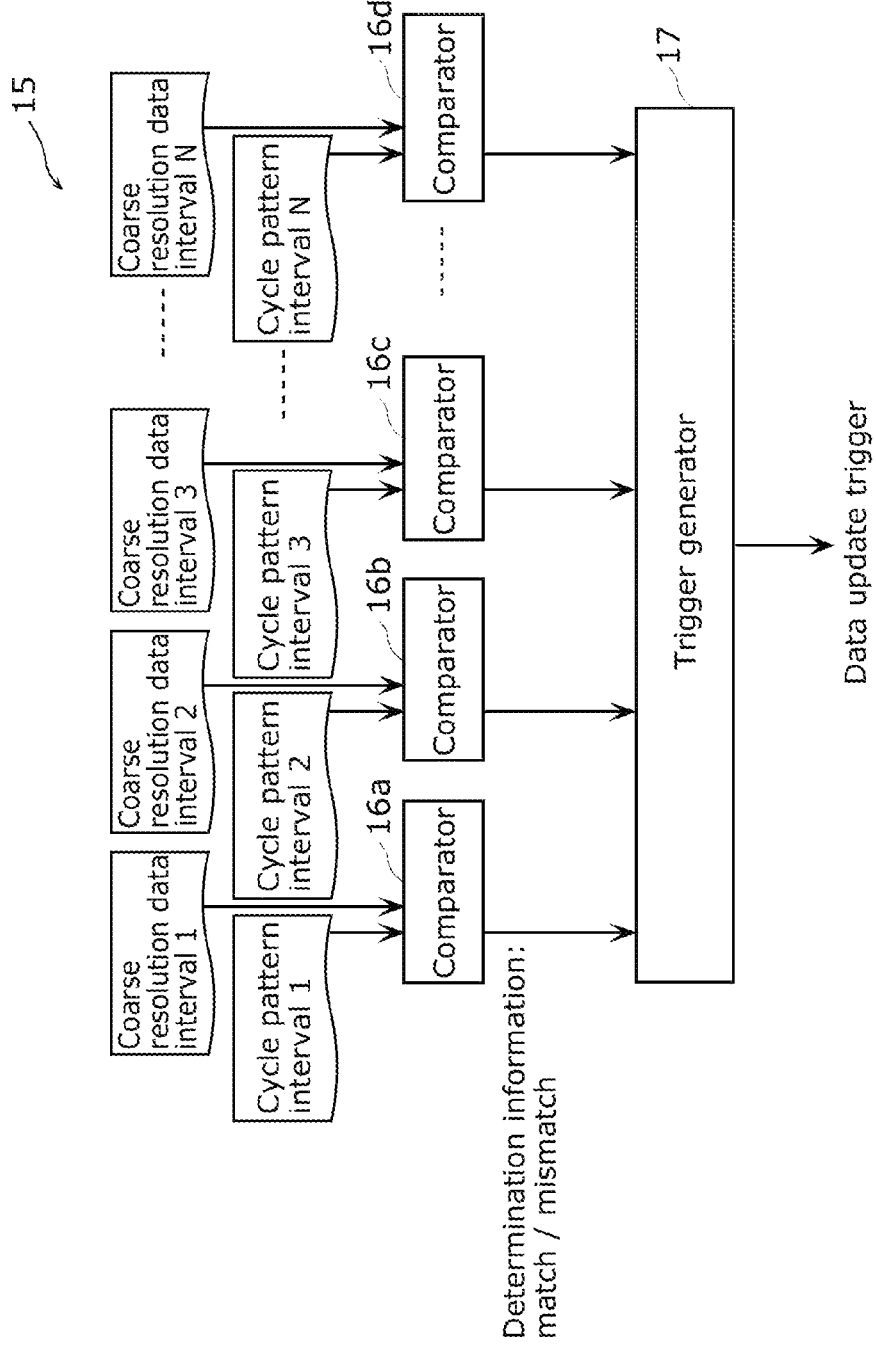

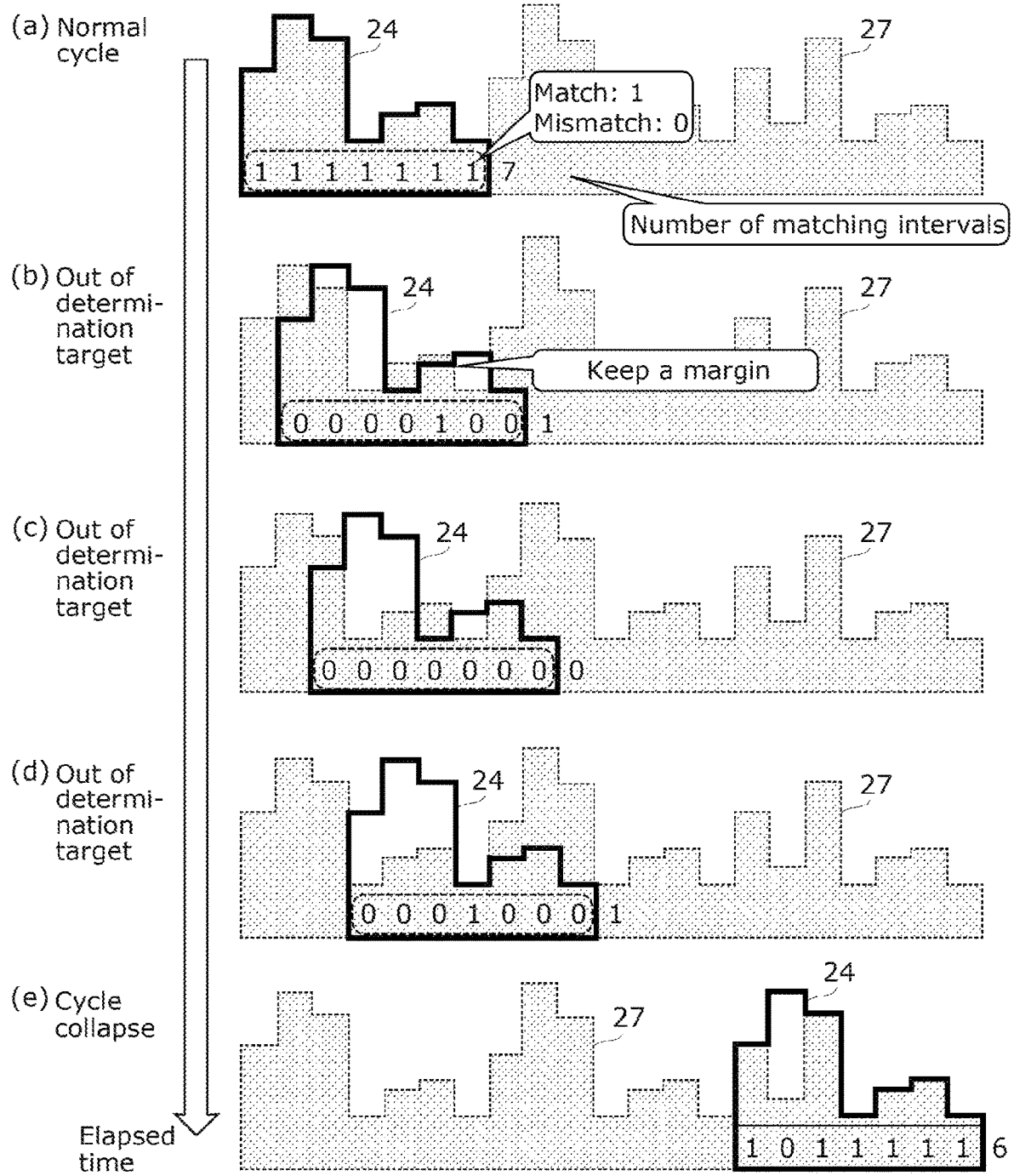

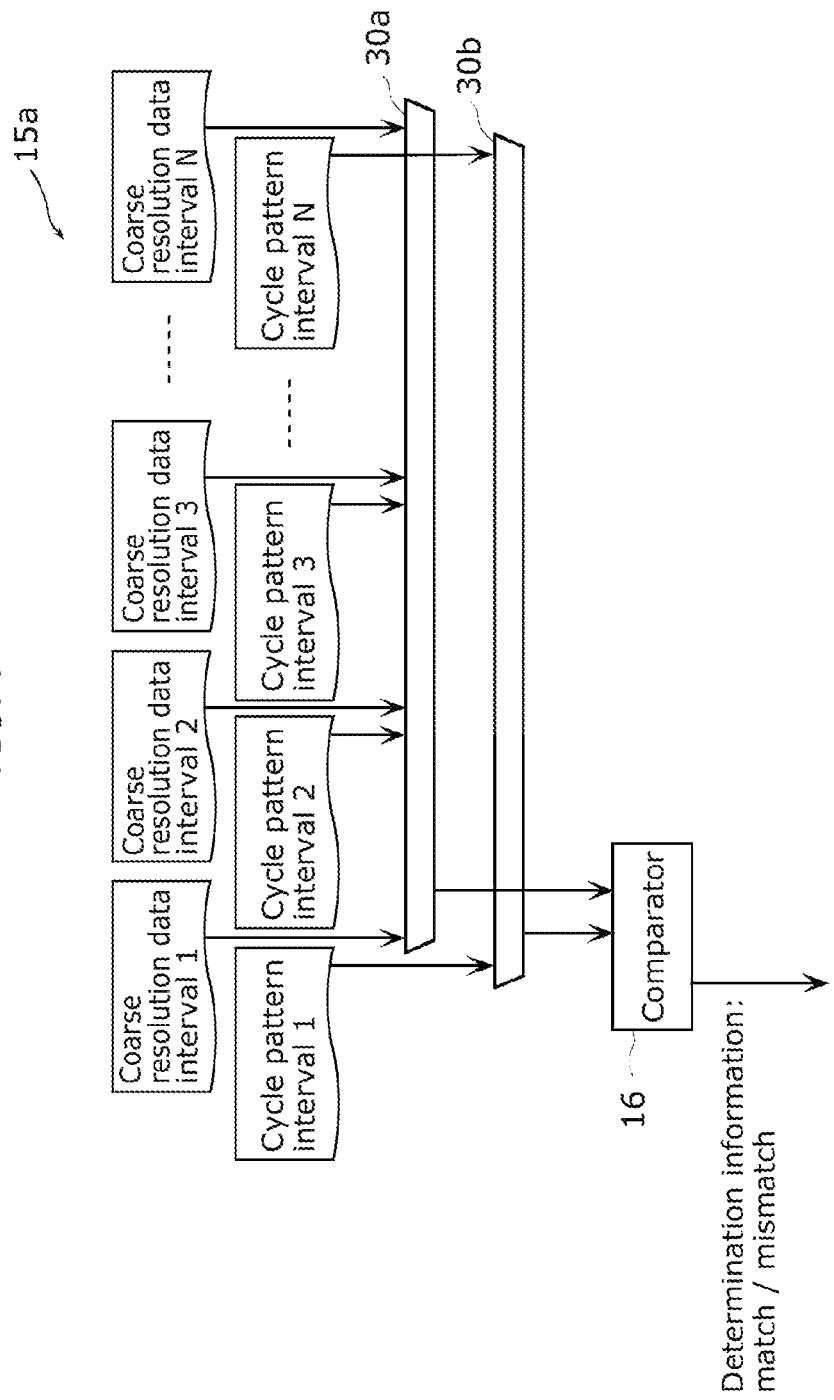

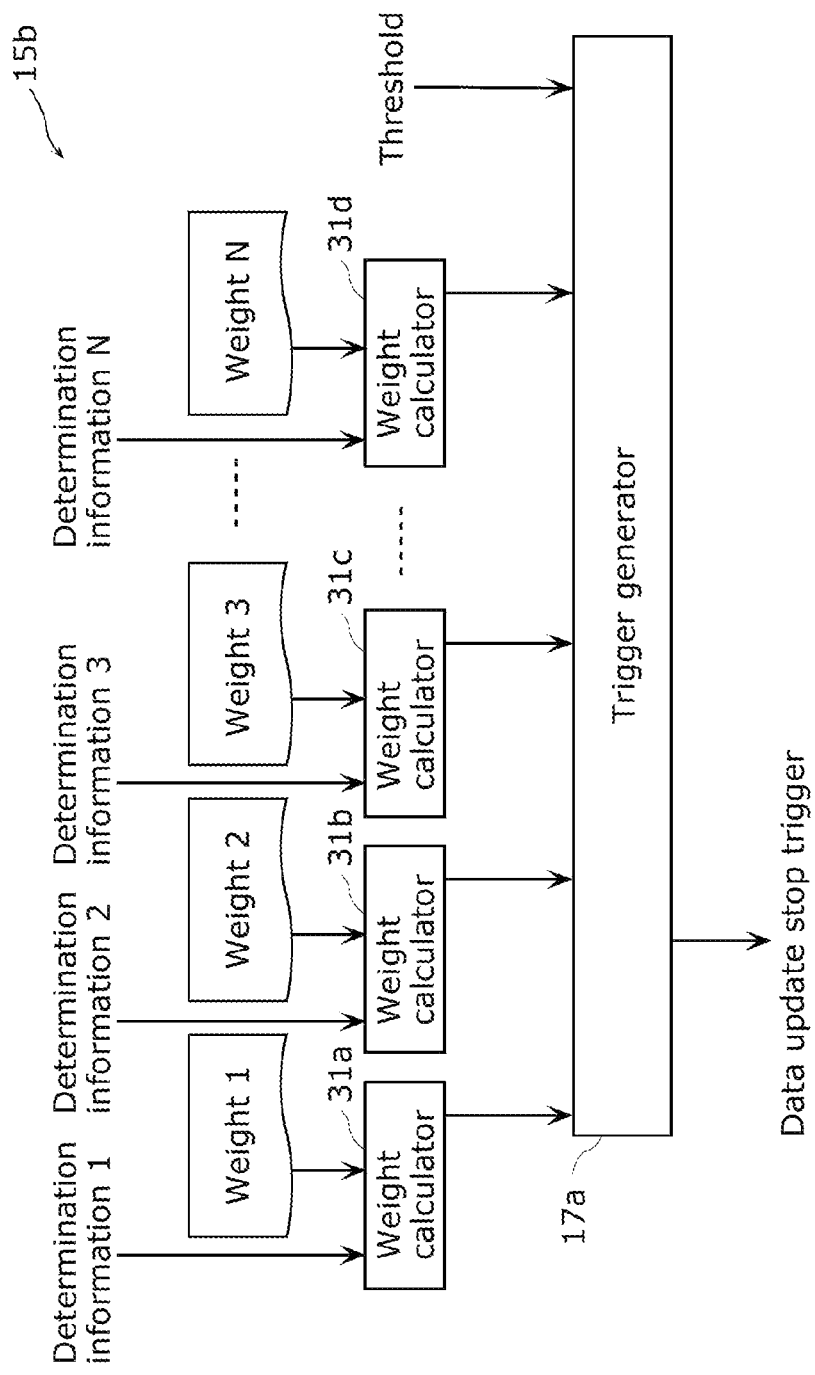

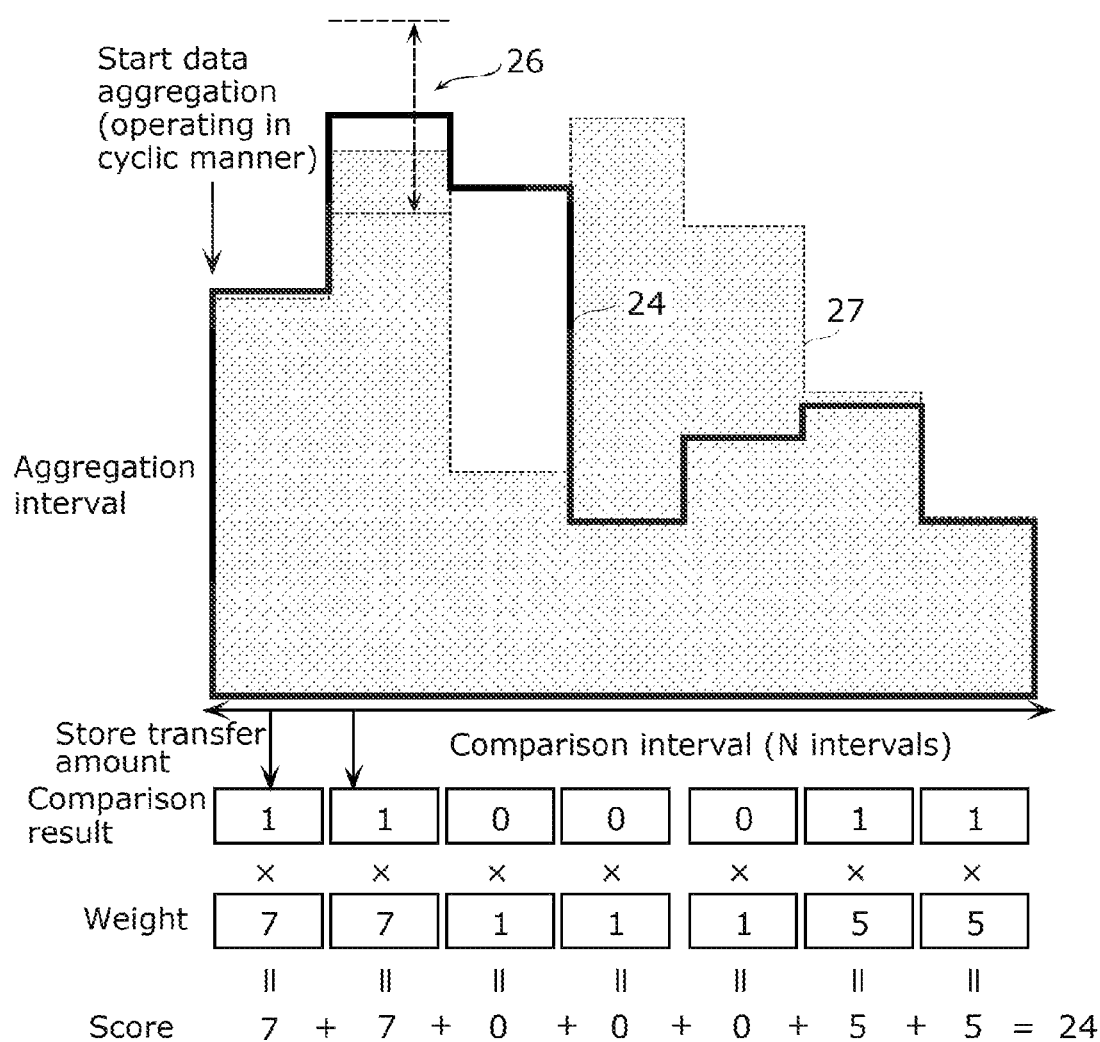

SIGNAL COLLECTION METHOD AND SIGNAL COLLECTION DEVICE

CROSS REFERENCE TO RELATED APPLICATION

This is a continuation application of PCT Patent Application No. PCT/JP2018/026379 filed on Jul. 12, 2018, designating the United States of America. The entire disclosure of the above-identified application, including the specification, drawings and claims is incorporated herein by reference in its entirety.

FIELD

The present disclosure relates to a signal collection method and a signal collection device, and more particularly to a signal collection method for collecting internal states indicated by signals in an electronic circuit device including a bus.

BACKGROUND

As the operation content in the LSI becomes complicated like SoC (System On Chip) in which the entire system is realized on one LSI with the improvement of the degree of integration of semiconductors, when the LSI cannot exhibit the intended performance, or when it does not work as intended, it becomes very difficult to determine what and how to track down to find the cause. Usually, the case where there is an operation abnormality is reproduced, and the cause is analyzed by analyzing various internal states of the LSI at that time.

In general, there is a strong correlation between the occurrence of an operation abnormality and the change in the data transfer amount on the bus in the system, so that information for analysis of the cause can be obtained by monitoring the states on the bus by some method and collecting the internal states of the LSI from the results.

For that purpose, a technique for observing the data transfer amount on the bus in the measurement target system has been conventionally proposed (see, for example, Patent literature (PTL) 1).

PTL 1 discloses a digital signal measuring device that generates a trigger using a signal obtained from a measurement target system via a probe and samples a desired signal using the generated trigger. With this, it is possible to observe the signal traffic on the bus in the measurement target system for a long time, and to observe in real time according to the operation of the measurement target system.

CITATION LIST

Patent Literature

PTL 1: Japanese Unexamined Patent Application Publication No. 2003-218872

SUMMARY

Technical Problem

However, the technique of PTL 1 requires a dedicated pin for probing, which causes a problem that the analysis cost is high. In addition, in the technique of PTL 1, since only the sampled information is observed, it is necessary to accumulate a huge amount of data in a wide timing range in order to obtain detailed information in the vicinity of the timing when the abnormality occurs, and for that reason, it requires a memory having a large storage capacity. In addition, when incorporating such a digital signal measuring device into the chip of the measurement target system, it is necessary to incorporate a dedicated pin and a memory having a large storage capacity into the chip, which increases the chip area and increases the chip cost.

Therefore, the present disclosure has been made in view of the above problems, and it is an object of the present disclosure to provide a signal collection method and a signal collection device which are realized by a simpler configuration than the conventional one and can obtain detailed information in the vicinity of the timing when an abnormality occurs in the measurement target system.

Solution to Problem

In order to achieve the above object, the signal collection method according to one form of the present disclosure is a method that collects internal states indicated by signals in an electronic circuit device including a bus, the signal collection method including: storing the internal states in a storage by obtaining the internal states per a first period; per a second period, which is longer than the first period: obtaining a first data transfer amount, which is a data amount transferred by the bus; calculating a difference between a second data transfer amount and the first data transfer amount obtained in the obtaining, the second data transfer amount being calculated in advance and obtained; and determining whether the difference calculated in the calculating is within a predetermined range to stop storing in the storing when it is determined that the difference is not within the predetermined range.

In order to achieve the above object, the signal collection device according to one form of the present disclosure is a device that collects internal states indicated by signals in an electronic circuit device including a bus, the signal collection device including: a fine resolution data storage that obtains and stores the internal states per a first period; a coarse resolution data storage that stores a first data transfer amount, which is a data amount transferred by the bus per a second period, which is longer than the first period; a pattern generator that stores the second data transfer amount calculated in advance; and a determiner that obtains the first data transfer amount from the coarse resolution data storage, obtains the second transfer amount from the pattern generator, calculates a difference between the first data amount obtained and the second data amount obtained, determines whether the difference calculated is within a predetermined range, and stops storing the internal states to the fine resolution data storage when it is determined that the difference is not within the predetermined range.

Advantageous Effects

According to the present disclosure, a signal collection method and a signal collection device which are realized by a simpler configuration than the conventional one and can obtain detailed information in the vicinity of the timing when an operation abnormality occurs in the measurement target system are realized.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram showing a detailed configuration of the cyclic nature determiner shown in FIG. 1.

FIG. 3D is a diagram showing a detailed operation example of the cyclic nature determiner of the signal collection device according to the embodiment.

FIG. 7 is a block diagram showing a configuration of the cyclic nature determiner according to Variation 3 of the embodiment.

FIG. 8A is a block diagram showing a configuration of the cyclic nature determiner according to Variation 4 of the embodiment.

FIG. 8C is a diagram showing an operation example of the cyclic nature determiner according to Variation 4 of the embodiment.

DESCRIPTION OF EMBODIMENT

Figure 1:
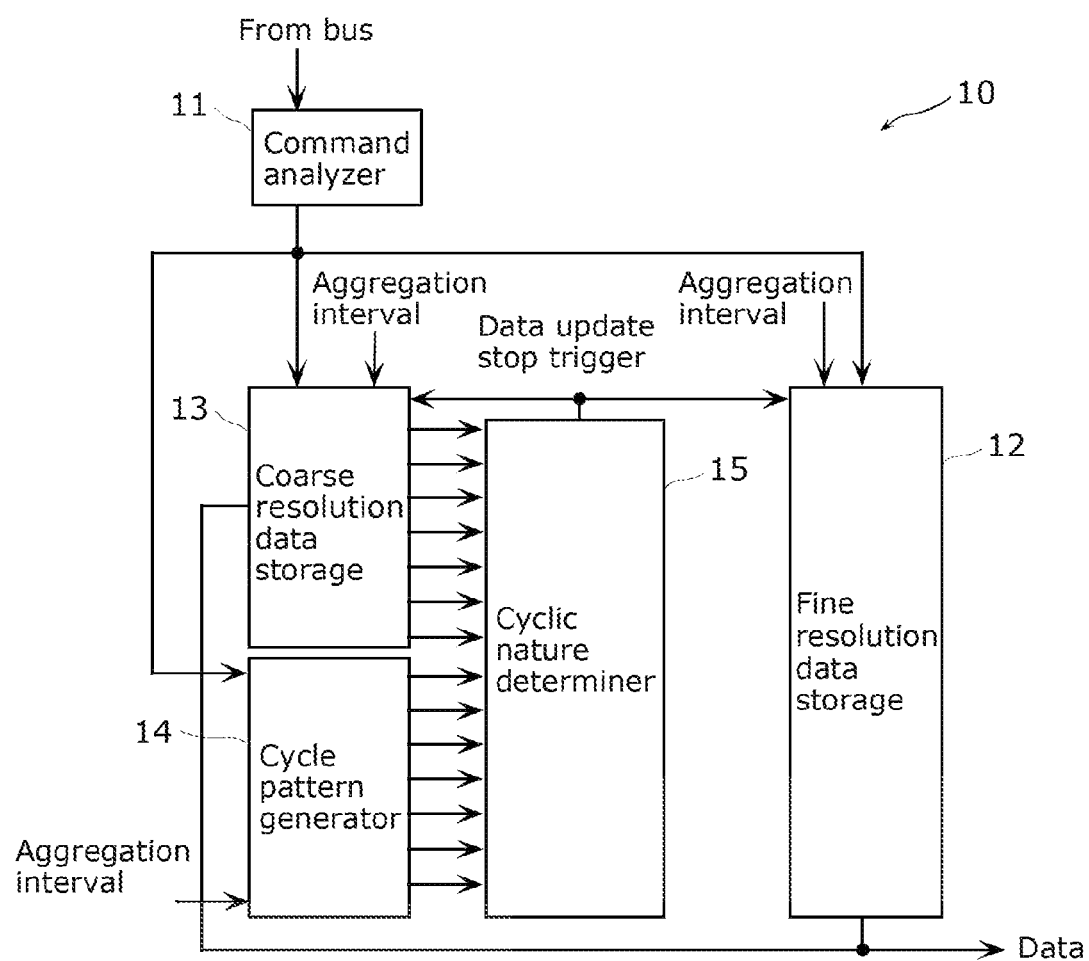
FIG. 1 is a block diagram showing a configuration of a signal collection device according to an embodiment.

Hereinafter, an embodiment of the present disclosure will be described in details with reference to the drawings. It should be noted that the embodiment described below shows a specific example of the present disclosure. The numerical values, shapes, components, arrangement positions and connection forms of the components, steps, order of steps, and the like shown in the following embodiment are examples, and are not intended to limit the present disclosure. In addition, among the components in the following embodiment, the components not described in the independent claims indicating the highest level concept are described as arbitrary components. In addition, each figure is not necessarily exactly illustrated. In each figure, substantially the same configuration may be designated by the same reference numerals, and duplicate description may be omitted or simplified.

FIG. 1 is a block diagram showing a configuration of signal collection device 10 according to the embodiment. Signal collection device 10 is a circuit that collects (that is, observes) the internal states indicated by signals in an electronic circuit device (not shown) including a bus. Here, the "electronic circuit device including a bus" is a measurement target system including a bus for data transfer, which may be realized by a one-chip LSI such as SoC, or a circuit on a printed circuit board. Signal collection device 10 is only needed to be electrically connected to the electronic circuit device of the measurement target, and specifically, may be incorporated and mounted in the electronic circuit device of the measurement target, or may be realized by a circuit separate from the electronic circuit device of the measurement target.

As shown in FIG. 1, signal collection device 10 includes command analyzer 11, fine resolution data storage 12, coarse resolution data storage 13, cycle pattern generator 14, and cyclic nature determiner 15.

Command analyzer 11 is a circuit that collects and analyzes commands related to data transfer via the bus included in the electronic circuit device of the measurement target, and the data transfer amount is specified and output for at least all data (data for Read only, Write only, or Read & Write) transferred via the bus.

More specifically, command analyzer 11 collects and analyzes commands at a location on the bus included in the electronic circuit device, Here, the "location on the bus" is specifically a location where the electronic circuit device interacts with the external memory, for example, in a memory controller included in the electronic circuit device. Command analyzer 11 specifies the data transfer amount, and outputs the specified data transfer amount to fine resolution data storage 12, coarse resolution data storage 13, and cycle pattern generator 14, each time the target data transfer occurs, by extracting parameters related to the data transfer amount included in the commands that cause data transfer (for example, the data width (number of bits) and burst length used for data transfer), or counting the number of commands that cause data transfer or the like.

Fine resolution data storage 12 is an example of a storage that obtains and stores an internal state per a first period (fine resolution, for example, 10 μsec), and is configured, for example, by a control circuit and a memory (for example, a shift register). The "internal state" is a combination of one or more signals in the electronic circuit device of the measurement target, and in the present embodiment, it is a data transfer amount generated within the first period (hereinafter, also referred to as "fine resolution data transfer amount").

More specifically, fine resolution data storage 12 repeats a process of calculating the total value of all the data transfer amounts input from command analyzer 11 and holding (shifting) it in the internal memory in the first period immediately before each time a signal for notifying the first period ("an aggregation interval" input to fine resolution data storage 12 in the figure) is input. That is, the process of storing the data transfer amount (that is, the internal state) per a first period is repeated.

It should be noted that fine resolution data storage 12 has a capacity for storing a predetermined amount of the internal states, and always holds the latest predetermined amount of the internal states. Thus, when fine resolution data storage 12 has already stored a predetermined amount of internal states (that is, there is no free space), fine resolution data storage 12 discards the oldest stored internal state and stores the latest internal state, or overwrites the latest internal state on the oldest internal state.

Here, when fine resolution data storage 12 receives a signal of the data update stop trigger output from cyclic nature determiner 15, fine resolution data storage 12 stops the process of storing the new internal state in the internal memory. In addition, fine resolution data storage 12 outputs all the internal states stored in the internal memory to the outside in accordance with the request from the outside.

Coarse resolution data storage 13 is a circuit that stores a first data transfer amount (hereinafter, also referred to as "coarse resolution data transfer amount"), which is an amount of data transferred by bus per a second period (coarse resolution, for example, 1 msec) longer than the first period, and configured, for example, by a control circuit and a memory (for example, a shift register).

More specifically, coarse resolution data storage 13 repeats a process of calculating the total value of all the data transfer amounts input from command analyzer 11 and holding (shifting) it in the internal memory in the second period immediately before each time a signal for notifying the second period ("an aggregation interval" input to coarse resolution data storage 13 in the figure) is input. That is, the process of storing the data transfer amount (that is, the internal state) per a first period is repeated.

In the present embodiment, coarse resolution data storage 13 has a capacity for storing N (N is an integer of one or more, preferably an integer of two or more, for example, seven) first data transfer amounts, and holds the latest N consecutive first data transfer amounts, Thus, when coarse resolution data storage 13 has already stored N first data transfer amounts (that is, there is no free space), coarse resolution data storage 13 discards the oldest stored first data transfer amount and stores the latest first data transfer amount, or overwrites the latest first data transfer amount on the oldest stored first data transfer amount.

Here, when coarse resolution data storage 13 receives a signal of the data update stop trigger output from cyclic nature determiner 15, coarse resolution data storage 13 stops the process of storing the new first data transfer amount in the internal memory. In addition, coarse resolution data storage 13 outputs all the first data transfer amounts stored in the internal memory to the outside in accordance with the request from the outside.

Cycle pattern generator 14 is an example of a pattern generator that stores a pre-calculated second data transfer amount, and in the present embodiment, cycle pattern generator 14 stores N second data transfer amounts (hereinafter, N second data transfer amounts are also referred to as "cycle pattern") in the internal register group, and outputs them to cyclic nature determiner 15. The "second data transfer amount" is an amount of data considered to be normal (that is, the expected value of the first data transfer amount) transferred by the bus included in the electronic circuit device of the measurement target in the second period. The N second data transfer amounts represent the expected value of the pattern (that is, the "cycle pattern") of one cycle or one cycle or more in the time change of the first data transfer amount.

In the present embodiment, cycle pattern generator 14 calculates the second data transfer amount by aggregating the data transfer amount sent from command analyzer 11 per a second period, and holds an amount of the first cycle in the time change of the second data transfer amount (that is, N second data transfer amounts), which is obtained when signal collection device 10 starts to observe, as the expected value of the N first data transfer amounts.

Cyclic nature determiner 15 is an example of a determiner that, per a second period, obtains the first data transfer amount from coarse resolution data storage 13, obtains the second data transfer amount from cycle pattern generator 14, calculates a difference between the obtained first data transfer amount and the obtained second data transfer amount, determines whether the calculated difference is within a predetermined range (that is a margin), and stops storing the internal states in fine resolution data storage 12 when it is determined that the difference is not within the predetermined range.

In the present embodiment, each time a new first data transfer amount is stored in coarse resolution data storage 13, cyclic nature determiner 15 obtains the N first data transfer amounts from coarse resolution data storage 13 and obtains the N second transfer amounts from cycle pattern generator 14, calculates differences between the values in the aggregation interval corresponding to the obtained N first data transfer amounts and the obtained N second data transfer amounts, determines whether the calculated N differences are within the predetermined range, certifies that the cycle collapse has occurred in the time change of the first data transfer amount based on the determination result (basically, when it is determined that the difference is not within the predetermined range), and stops storing new data transfer amounts in fine resolution data storage 12 and coarse resolution data storage 13 by outputting the data update stop trigger to fine resolution data storage 12 and coarse resolution data storage 13 after the preset variable third period (that is, the value written in the internal register) has elapsed from the certification.

It should be noted that the number of the first data transfer amount and the second data transfer amount used by cyclic nature determiner 15 for determining the cyclic nature is not necessarily limited to be N (that is, the physical storing capacity of coarse resolution data storage 13 and cycle pattern generator 14). It may be any number of N or less. In that case, cyclic nature determiner 15 has a register that stores the number of data transfer amounts used for comparison, and the number of first data transfer amounts and the second data transfer amounts corresponding to the value stored in the register are obtained and compared.

FIG. 2 is a block diagram showing a detailed configuration of cyclic nature determiner 15 shown in FIG. 1. Cyclic nature determiner 15 includes N comparators 16a to 16d and trigger generator 17.

Comparator 16a compares the first one of the N first data transfer amounts obtained from coarse resolution data storage 13 ("coarse resolution data interval 1" in FIG. 2) and the first one of the N second data transfer amounts obtained from cycle pattern generator 14 ("cycle pattern interval 1" in FIG. 2), generates the determination information indicating "match (for example, 1)" when "coarse resolution data interval 1" is within the margin range based on "cycle pattern interval 1", or the determination information indicating "mismatch (for example, 0)" when otherwise, and outputs the generated determination information to trigger generator 17.

Comparator 16b compares the second one of the N first data transfer amounts obtained from coarse resolution data storage 13 ("coarse resolution data interval 2" in FIG. 2) and the second one of the N second data transfer amounts obtained from cycle pattern generator 14 ("cycle pattern interval 2" in FIG. 2), generates the determination information indicating "match (for example, 1)" when "coarse resolution data interval 2" is within the margin range based on "cycle pattern interval 2", or the determination information indicating "mismatch (for example, U)" when otherwise, and outputs the generated determination information to trigger generator 17.

Similarly, comparators 16c to 16d compare the first data transfer amounts and the second data transfer amounts in the corresponding aggregation intervals, generate determination information indicating the comparison results, and output the generated determination information to trigger generator 17.

Trigger generator 17 determines whether a cycle collapse has occurred in the time change of the first data transfer amount (that is, "coarse resolution data") based on the determination information output from N comparators 16a to 16d, and outputs the data update stop trigger to fine resolution data storage 12 and coarse resolution data storage 13 when the cycle collapse is determined to have occurred.

Next, the operation of signal collection device 10 according to the present embodiment configured as described above will be described with reference to diagrams showing examples of changes in the data transfer amount illustrated in FIG. 3A to FIG. 3C and flowcharts showing the operation (that is, the signal collection method) of signal collection device 10 illustrated in FIG. 4A to FIG. 4E.

Figure 3A:
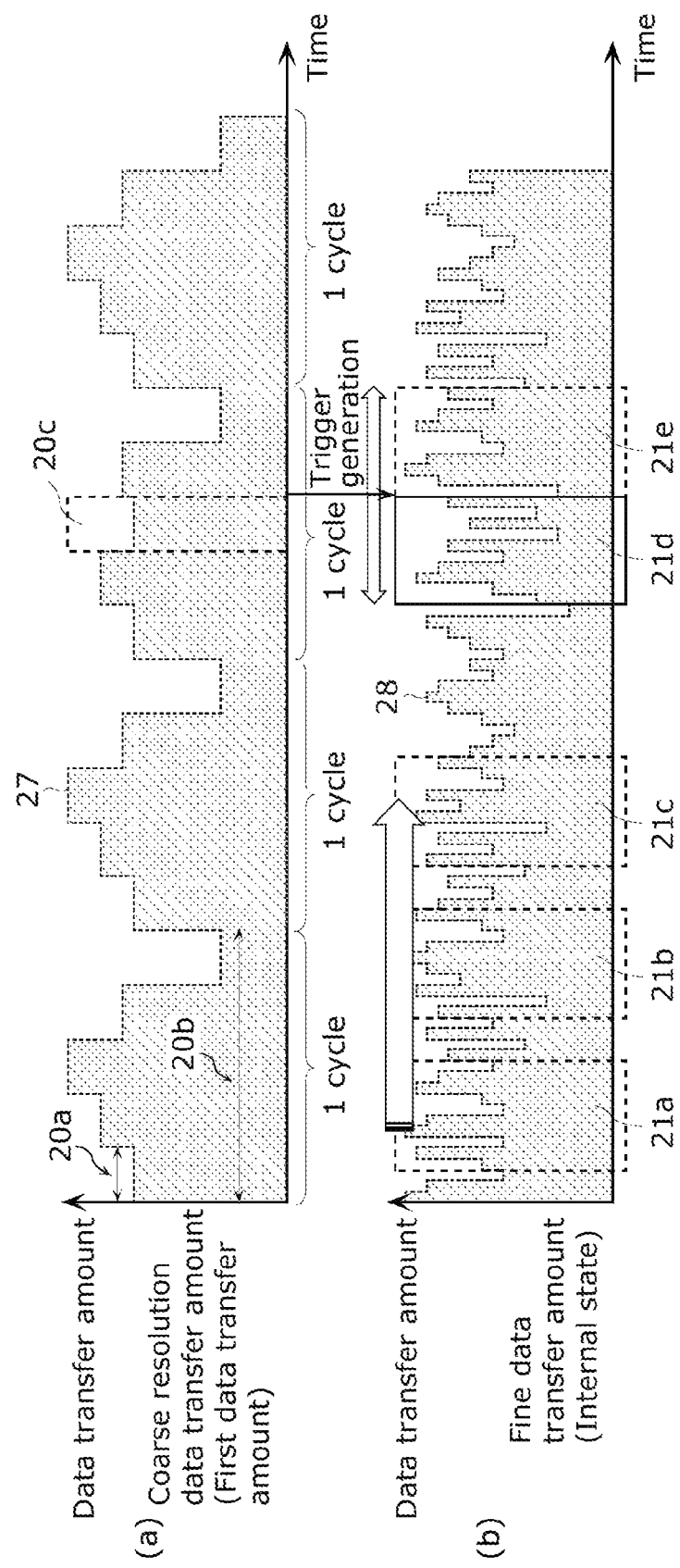
FIG. 3A is a diagram showing an example of a change in a data transfer amount for illustrating the basic operation of the signal collection device according to the embodiment.

FIG. 3A is a diagram showing an example of a change in the data transfer amount for illustrating the basic operation of signal collection device 10 according to the embodiment. (a) in FIG. 3A is a diagram showing an example in a time change of coarse resolution data transfer amount 27 (that is, the first data transfer amount) observed by signal collection device 10. (b) in FIG. 3A is a diagram showing an example in a time change of fine resolution data transfer amount (that is, internal state) 28 observed by signal collection device 10 in parallel with the observation illustrated in (a) in FIG. 3A.

According to signal collection device 10 according to the present embodiment, the time change of the data transfer amount in the same measurement target (that is, the bus of the electronic circuit device) is observed with a fine resolution ((b) in FIG. 3A) by fine resolution data storage 12 (that is, per a first period (<second period)) in parallel with being observed with a coarse resolution ((a) in FIG. 3A) by coarse resolution data storage 13 (that is, per a second period).

Then, the cyclic nature (a pattern in comparison period 20b configured by N aggregation intervals (that is, the second period) 20a in (a) in FIG. 3A) in the time change of coarse resolution data transfer amount 27 is determined by cyclic nature determiner 15 and when cycle collapse 20c is determined to have occurred, a data update stop trigger is generated after the third period has elapsed from the determination, and thereby storing of fine resolution data transfer amount 28 in fine resolution data storage 12 is caused to stop ((b) in FIG. 3A).

As a result, the time change of data transfer amount 28 with a fine resolution before and after (or only before or only after) the timing when the cycle collapse has occurred in the time change of coarse resolution data transfer amount 27 is observed (stored data 21e in (b) in FIG. 3A), and is used for detailed analysis of the cause of the cycle collapse.

In general, the time change of the data transfer amount on the bus seems to change randomly individually, but when the change of the data transfer amount is seen for each unit time of an appropriate resolution (here, coarse resolution), when an application executed by an electronic circuit device such as SoC is operating stably, the data transfer amount on the bus transits at a certain cycle, and when the cyclic nature is collapsed, there are many cases where some kind of trouble has occurred. Therefore, in signal collection device 10 according to the present embodiment, it is made possible to observe detailed data (that is, internal states) before and after the timing when the cyclic nature is collapsed in the time change of coarse resolution data transfer amount 27.

Figure 4A:
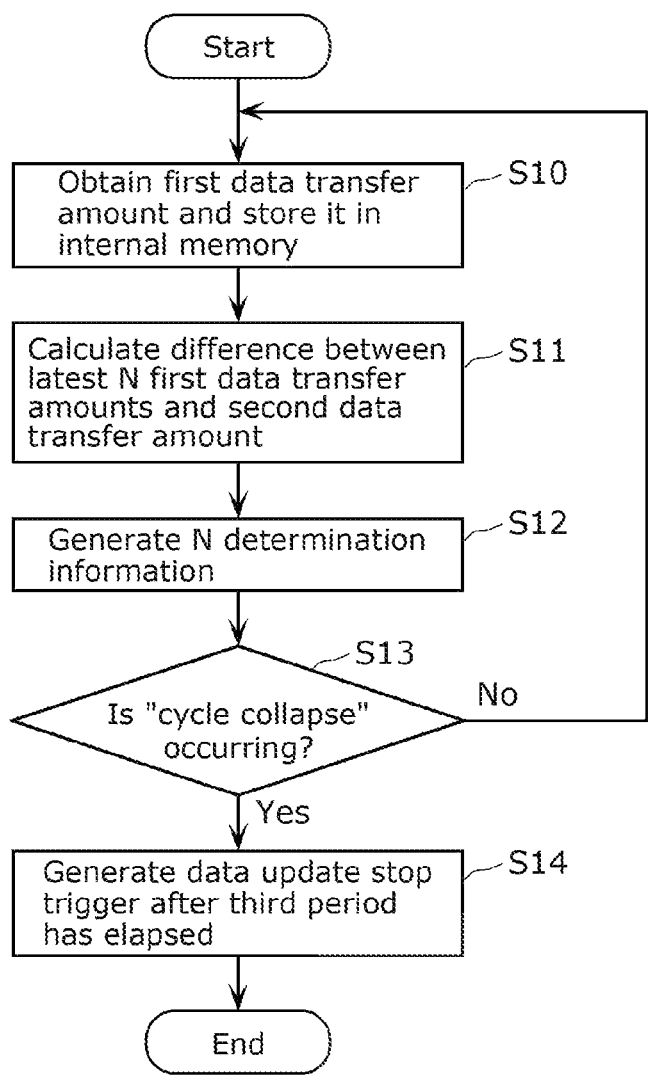
FIG. 4A is a flowchart showing the operations of the coarse resolution data storage and the cyclic nature determiner of the signal collection device according to the embodiment.

FIG. 4A is a flowchart showing the operations of coarse resolution data storage 13 and cyclic nature determiner 15 of signal collection device 10 according to the embodiment. Here, among the signal collection methods by signal collection device 10, the processing performed with a coarse resolution (that is, in one second period) is shown.

It should be noted that when the observation of signal collection device 10 is started, command analyzer 11 specifies the data transfer amount is specified by command analyzer 11 each time the data is transferred on the bus of the electronic circuit device of the measurement target, and is output to fine resolution data storage 12 and coarse resolution data storage 13. In addition, cycle pattern generator 14 holds the expected value of N first data transfer amounts, that is, N second data transfer amounts using the data transfer amount obtained when signal collection device 10 starts observing.

First, coarse resolution data storage 13 obtains the first data transfer amount by aggregating the data transfer amount sent from command analyzer 11 in the second period (that is, with a coarse resolution), and stores the obtained first data transfer amount in the internal memory (first data transfer amount obtaining step S10).

It should be noted that coarse resolution data storage 13 has a capacity for storing N first data transfer amounts, and when it has already stored N first data transfer amounts (that is, there is no free space), it discards the oldest stored first data transfer amount and stores the latest first data transfer amount, or overwrites the latest first data transfer amount on the oldest stored first data transfer amount, and thereby it always holds the latest N consecutive first data transfer amounts.

Next, cyclic nature determiner 15 (more specifically, N comparators 16a to 16d of cyclic nature determiner 15) obtains N first data transfer amounts from coarse resolution data storage 13, obtains N second data transfer amounts from cycle pattern generator 14, calculates differences between the values in the aggregation interval corresponding to the obtained N first data transfer amounts and the obtained N second data transfer amounts (difference calculating step S11), and generates determination information indicating whether the calculated N differences are within the predetermined range (S12).

Then, cyclic nature determiner 15 (more specifically, trigger generator 17 of cyclic nature determiner 15) determines whether the cycle collapse has occurred in the time change of the first data transfer amount based on the generated N items of determination information (S13).

As a result, when the cycle collapse is determined to have occurred (Yes in S13), cyclic nature determiner 15 (more specifically, trigger generator 17 of cyclic nature determiner 15) outputs the data update stop trigger to fine resolution data storage 12 and coarse resolution data storage 13 after the preset variable third period has elapsed from the determination (S14).

On the other hand, when cyclic nature determiner 15 determines that no cycle collapse has occurred (No in S13), the same processing (S10 to S14) is repeated again in the next second period.

Figure 4B:
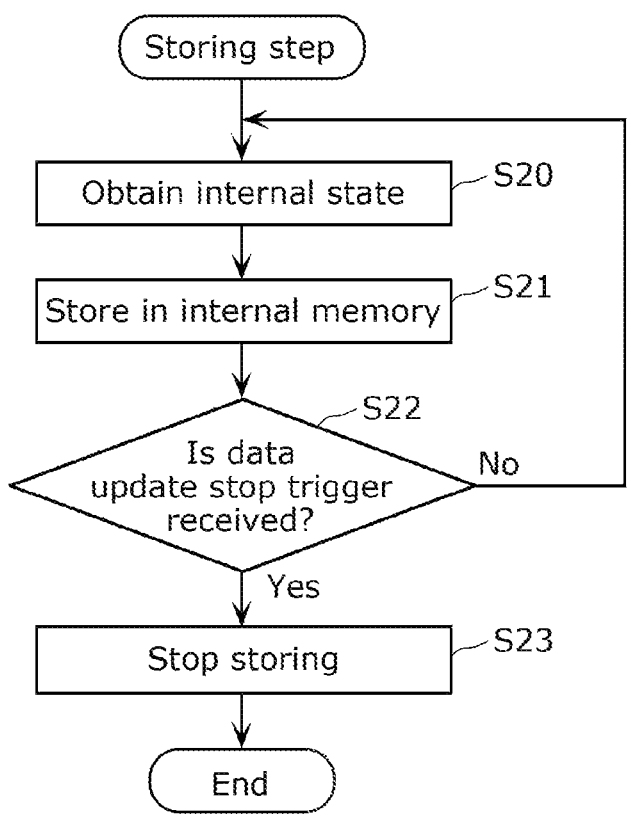
FIG. 4B is a flowchart showing the operation of the fine resolution data storage of the signal collection device according to the embodiment.

It should be noted that steps S12 to S14 correspond to the determining step in which it is determined whether the difference calculated in the difference calculation step S11 is within the predetermined range, and when it is determined that the difference is not within the predetermined range, storing in the storing step shown in FIG. 4B is caused to stop.

By the above processing, as shown in (a) in FIG. 3A, repeating the same pattern (cyclic nature) for each comparison period 20b configured by N aggregation intervals 20a is determined in the time change of the coarse resolution data transfer amount, and when cycle collapse 20c is determined to have occurred, cyclic nature determiner 15 outputs a data update stop trigger to fine resolution data storage 12 and coarse resolution data storage 13.

FIG. 4B is a flowchart showing the operations of fine resolution data storage 12 of signal collection device 10 according to the embodiment, Here, among the signal collection methods by signal collection device 10, the processing (that is, the storing step) performed with a fine resolution (that is, in one first period) is shown.

First, fine resolution data storage 12 obtains the internal state (S20) by aggregating the data transfer amount from command analyzer 11 in the first period (that is, with a fine resolution), and stores the obtained internal state in the internal memory (S21). It should be noted that fine resolution data storage 12 has a capacity for storing a predetermined amount of the internal states, and when it has already stored the predetermined amount of the internal states (that is, there is no free space), it discards the oldest stored internal state and stores the latest internal state, or overwrites the latest internal state on the oldest stored internal state, and thereby it always holds the latest predetermined amount of internal states.

Then, fine resolution data storage 12 determines whether the signal of the data update stop trigger output from cyclic nature determiner 15 has been received (S22).

As a result, when the signal of the data update stop trigger is determined to have been received (Yes in S22), fine resolution data storage 12 stops the process of storing the new internal state in the internal memory (S23).

On the other hand, when the signal of the data update stop trigger is not determined to have been received (No in S22), fine resolution data storage 12 again repeats the same processing (S20 to S23) in the next first period.

With this, fine resolution data storage 12 repeatedly obtains and discards the internal state as in the time change of the fine resolution data transfer amount shown in (b) in FIG. 3A (that is, the state of the internal memory is changed from stored data 21a to stored data 21b, stored data 21c and stored data 21d), and then the data update stop signal issued at the time when the third period has elapsed after the cycle collapse occurred for the coarse resolution data transfer is received, and the storing process is caused to stop at the received timing. As a result, fine resolution data storage 12 is in a state where stored data 21e, which has the last data of the internal state obtained at the timing when the third period has elapsed after the cycle collapse occurred for the coarse resolution data transfer, is held, the storing process is caused to stop, and the data can be read to the outside.

Figure 3B:
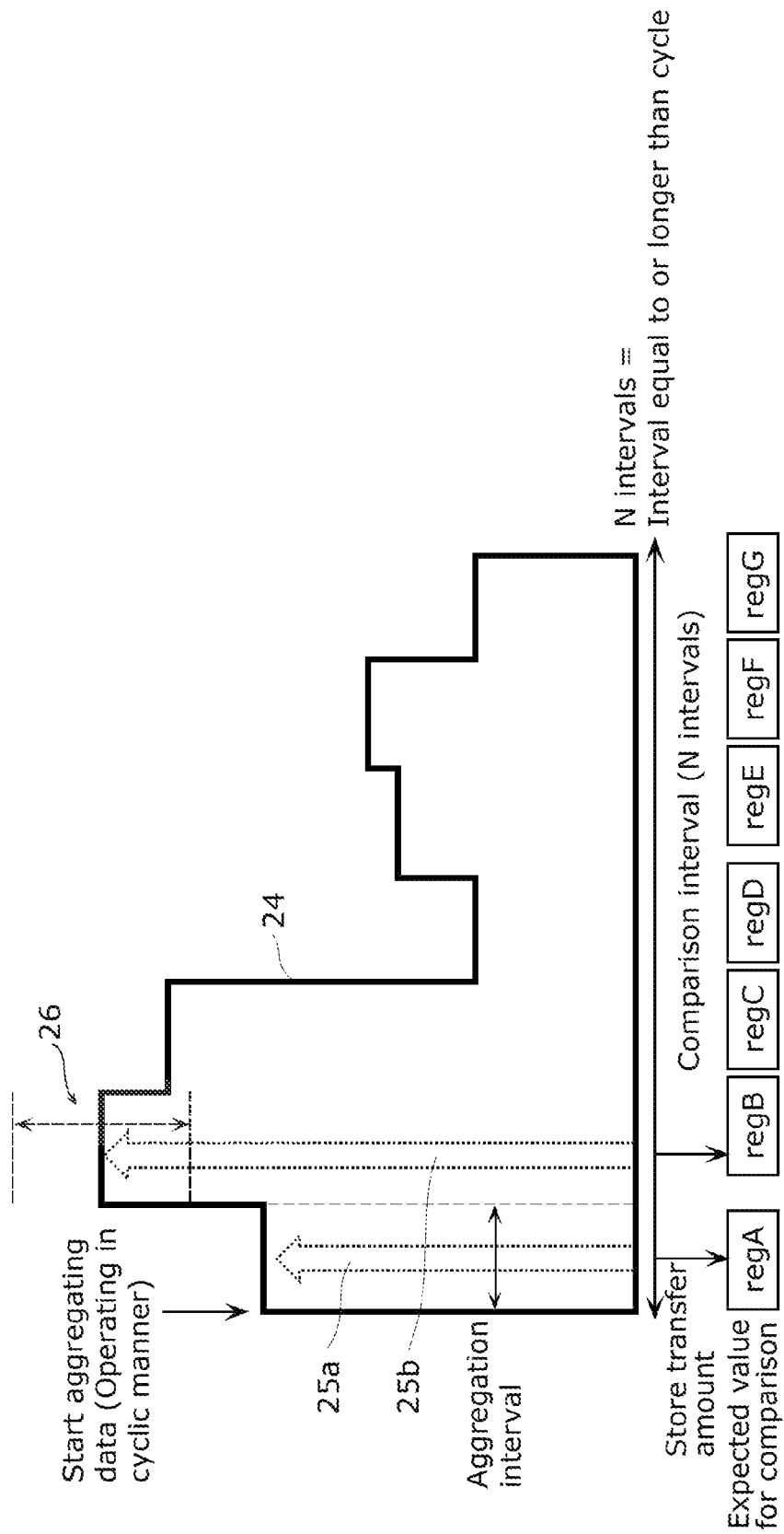
FIG. 3B is a diagram illustrating the operation of the cycle pattern generator of the signal collection device according to the embodiment.

FIG. 3B is a diagram illustrating the operations of cycle pattern generator 14 of signal collection device 10 according to the embodiment. When signal collection device 10 starts observing, cycle pattern generator 14 calculates second data transfer amounts 25a and 25b by aggregating the data transfer amount sent from command analyzer 11 per a second period (that is, with a coarse resolution) to hold them in the internal N registers (regA, regB, regG) in order. As a result, cycle pattern generator 14 holds cycle pattern 24 for coarse resolution data transfer, that is, the expected value of N first data transfer amounts (that is, N second data transfer amounts).

It should be noted that for each aggregation interval (each of the N second data transfer amounts), margin 26 used for determining matching or mismatching with the first data transfer amount can be arbitrarily set. In this case, for example, the lower limit value and the upper limit value of the second data transfer amount in the aggregation interval are held in each of the N registers (regA, regB, . . . , regG). As a result, in the comparison between the first data transfer amount and the second data transfer amount of the corresponding aggregation interval in cyclic nature determiner 15, when the first data transfer amount is equal to or more than the lower limit value of the second data transfer amount and equal to or less than the upper limit value, determination information indicating "match" is generated.

Figure 3C:
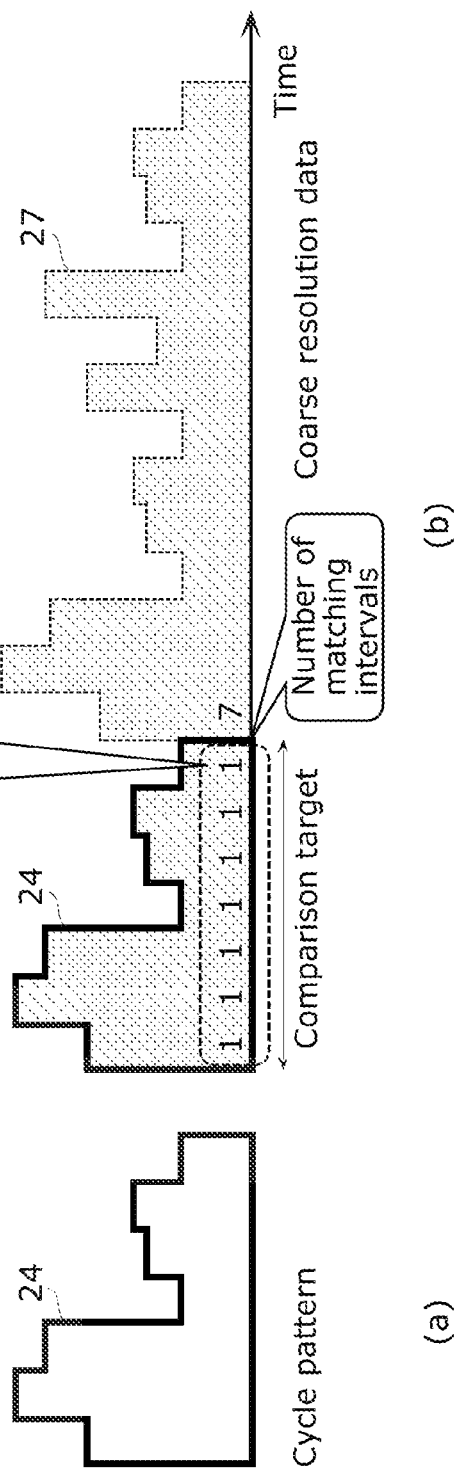
FIG. 3C is a diagram showing a basic operation of the cyclic nature determiner of the signal collection device according to the embodiment.

FIG. 3C is a diagram showing basic operations (that is, details of steps S11 and S12 of FIG. 4A) of cyclic nature determiner 15 of signal collection device 10 according to the embodiment. (a) in FIG. 3C shows an example of N second data transfer amounts (that is, cycle pattern 24) obtained from cycle pattern generator 14. (b) in FIG. 3C shows an example of coarse resolution data transfer amount (that is, first data transfer amount) 27 stored in coarse resolution data storage 13.

Cyclic nature determiner 15 calculates the differences between the values of the aggregation interval with cycle pattern 24 with N coarse resolution data transfer amounts 27 as a unit (S11 in FIG. 4A), and generates N items of determination information indicating whether each of the calculated N differences is within a predetermined range (within the range of the margin set in cycle pattern generator 14) (if it is within the range, it indicates "1 (match)", and if it is not within the range, it indicates "0 (mismatch)") (S12 in FIG. 4A).

Figure 4C:
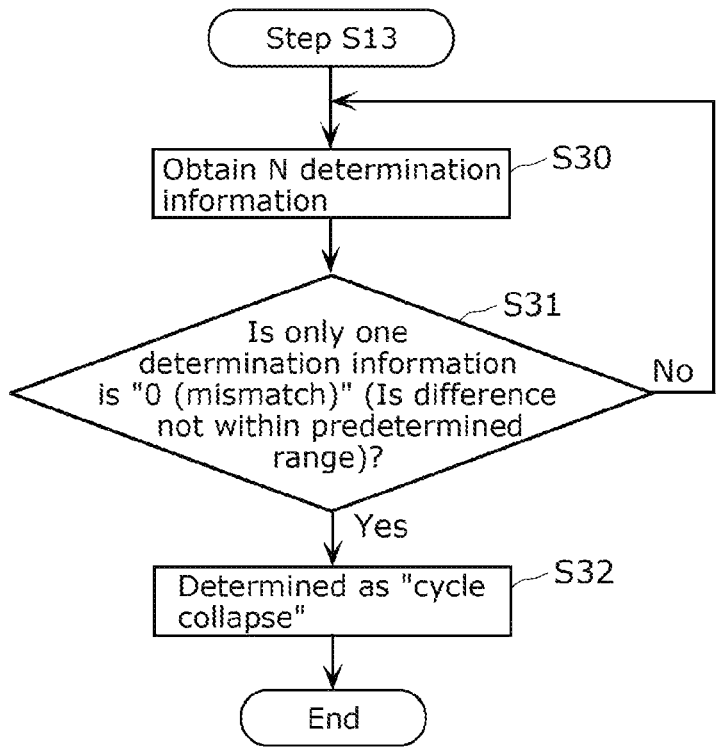
FIG. 4C is a flowchart showing details (first example) of step S13 in FIG. 4A.

FIG. 4C is a flowchart showing details (first example) of step S13 (determination of "cycle collapse") in FIG. 4A. Here, an example of a case where it is determined as "cycle collapse" is illustrated.

First, in cyclic nature determiner 15, trigger generator 17 obtains N items of determination information, which indicate whether the respective values of the aggregation intervals corresponding to N first data transfer amounts and N second data transfer amounts (that is, cycle patterns) match each other (that is, the difference is within a predetermined range), from N comparators 16a to 16d (S30).

Then, trigger generator 17 determines whether only one of the obtained N items of determination information indicates "0 (mismatch)" (that is, the difference is not within the predetermined range) (S31).

As a result, trigger generator 17 determines that the cycle collapse has occurred (S32) only when only one of the N items of determination information is determined to indicate "0 (mismatch)" (Yes in S31).

Figure 4D:
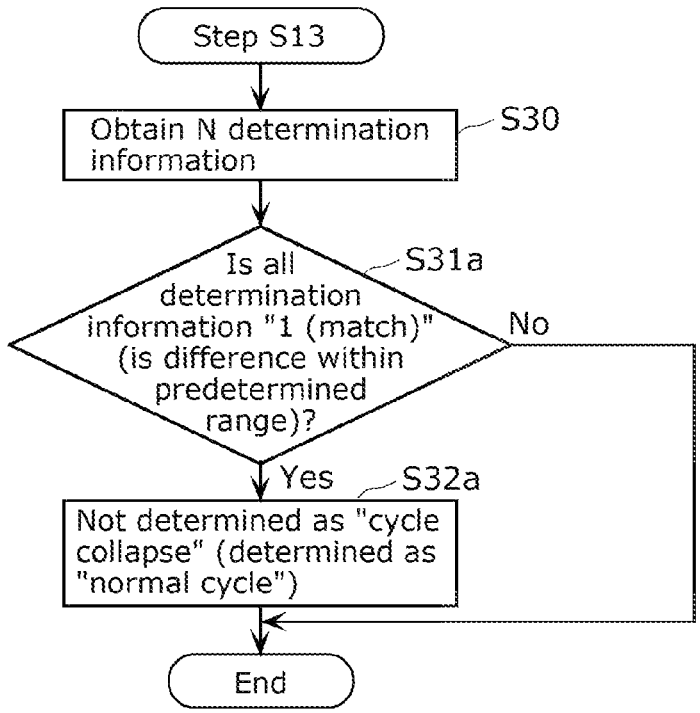
FIG. 4D is a flowchart showing details (second example) of step S13 in FIG. 4A.

FIG. 4D is a flowchart showing details (second example) of step S13 (determination of "cycle collapse") in FIG. 4A, Here, an example of a case where it is not determined to be "cycle collapse" is shown.

First, in cyclic nature determiner 15, trigger generator 17 obtains N items of determination information, which indicate whether the respective values of the aggregation intervals corresponding to N first data transfer amounts and N second data transfer amounts (that is, cycle patterns) match each other (that is, the difference is within a predetermined range), from N comparators 16a to 16d (S30).

Then, trigger generator 17 determines whether all of the obtained N items of determination information indicates "1 (match)" (that is, the difference is within the predetermined range) (S31a).

As a result, trigger generator 17 does not determine that the cycle collapse has occurred (that is, it determines that it is a normal cycle) (S32a) only when all of the N items of determination information are determined to indicate "1 (match)" (Yes in S31a).

Figure 4E:
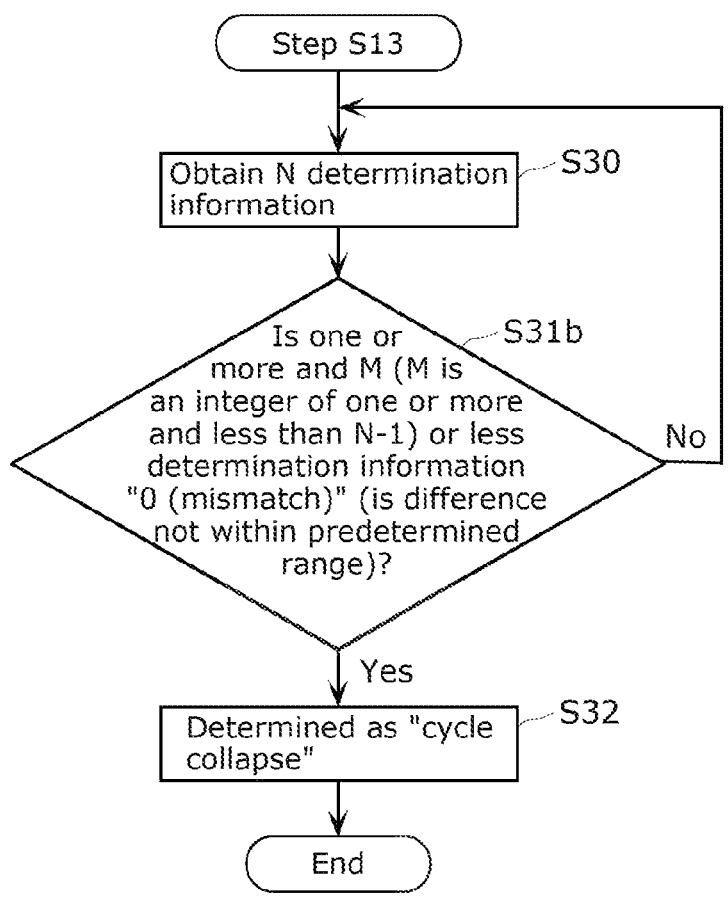
FIG. 4E is a flowchart showing details (third example) of step S13 in FIG. 4A.

FIG. 4E is a flowchart showing details (third example) of step S13 (determination of "cycle collapse") in FIG. 4A. Here, an example of a case where it is determined to be "cycle collapse" is shown.

First, in cyclic nature determiner 15, trigger generator 17 obtains N items of determination information, which indicate whether the respective values of the aggregation intervals corresponding to N first data transfer amounts and N second data transfer amounts (that is, cycle patterns) match each other (that is, the difference is within a predetermined range), from N comparators 16a to 16d (S30).

Then, trigger generator 17 determines whether one or more and M (M is an integer of one or more and less than N−1) or less determination information of the obtained N items of determination information indicate "0 (mismatch)" (that is, the difference is not within the predetermined range) (S31b).

As a result, trigger generator 17 determines that the cycle collapse has occurred (S32) only when one or more and M or less determination information is determined to indicate "0 (mismatch)" (Yes in S31b).

It should be noted that all of the determination methods according to the flowcharts shown in FIG. 4C to FIG. 4E described above may be implemented in cyclic nature determiner 15, and one or two of them may be implemented in cyclic nature determiner 15.

In addition, trigger generator 17 of cyclic nature determiner 15 is not a target for the determination of the cycle collapse (that is, it is treated as out of the determination target). That is, in this case, trigger generator 17 does not output the data update stop trigger.

FIG. 3D is a diagram showing a detailed operation example of the cyclic nature determiner of signal collection device 10 according to the embodiment (that is, an operation example of the flowcharts shown in FIG. 4C to FIG. 4E). (a) to (e) in FIG. 3D show the transition of the N (here, 7) first data transfer amounts (the part surrounded by the black frame) to be the determination targets by cyclic nature determiner 15 when the time (that is, the first period) has elapsed in this order. The graph extending horizontally is a time change of coarse resolution data transfer amount (that is, first data transfer amount) 27, The black frame is cycle pattern (that is, N (here, 7) second data transfer amounts) 24 held by cycle pattern generator 14. The N numerical values (0 or 1) in the black frame indicate the determination information for each aggregation interval, and the numeric& values placed next to the N items of determination information indicate the total number of determination information indicating "1 (match)" In the operation example shown in this figure, cyclic nature determiner 15 operates as follows.

As shown in (a) in FIG. 3D, in the initial first period, the N first data transfer amounts to be the determination targets completely match cycle pattern 24, Therefore, trigger generator 17 of cyclic nature determiner 15 determines that all of the obtained N items of determination information indicates "1 (match)", so that it does not determine that the cycle collapse has occurred (that is, it is determined to be a normal cycle) (see FIG. 4D).

In addition, as shown in (b) in FIG. 3D, in the next first period, only one of the N first data transfer amounts to be the determination targets matches cycle pattern (that is, one second data transfer amount) 24. It should be noted that as shown in (b) in FIG. 3D, the determination of the match here is obtained because the first data transfer amount is within the margin range based on the second data transfer amount. Therefore, trigger generator 17 of cyclic nature determiner 15 determines that N−1 of the obtained N items of determination information indicates "0 (mismatch)", so that it is a case that does not correspond to any of the flowcharts shown in FIG. 4C to FIG. 4E described above, and thus, it is out of the target of the determination of cycle collapse.

In addition, as shown in (c) in FIG. 3D, in the further next first period, all of the N first data transfer amounts to be the determination targets do not match cycle patterns (that is, one second data transfer amount). Therefore, trigger generator 17 of cyclic nature determiner 15 determines that all of the obtained N items of determination information indicates "0 (mismatch)", so that it is a case that does not correspond to any of the flowcharts shown in FIG. 4C to FIG. 4E described above, and thus, it is out of the target of the determination of cycle collapse.

In addition, as shown in (d) in FIG. 3D, in the further next first period, only one of the N first data transfer amounts to be the determination targets matches cycle pattern (that is, one second data transfer amount) 24. Therefore, trigger generator 17 of cyclic nature determiner 15 determines that N−1 of the obtained N items of determination information indicates "0 (mismatch)", so that it is a case that does not correspond to any of the flowcharts shown in FIG. 4C to FIG. 4E described above, and thus, it is out of the target of the determination of cycle collapse.

In addition, as shown in (e) in FIG. 3D, after a plurality of first periods have elapsed, only one of the N first data transfer amounts to be the determination targets mismatches a cycle pattern (that is, one second data transfer amount) 24, Therefore, trigger generator 17 of cyclic nature determiner 15 determines that only one of the obtained N items of determination information indicates "0 (mismatch)", so that the cycle collapse is determined to have occurred (see FIG. 4C).

As described above, signal collection device 10 according to the present embodiment is a device that collects internet states indicated by signals in an electronic circuit device including a bus, the device including: fine resolution data storage 12 that obtains and stores the internet states per a first period; coarse resolution data storage 13 that stores a first data transfer amount, which is a data amount transferred by the bus per a second period, which is longer than the first period; cycle pattern generator 14 that stores the second data transfer amount calculated in advance; and cyclic nature determiner 15 that obtains the first data transfer amount from coarse resolution data storage 13, obtains the second transfer amount from cycle pattern generator 14, calculates a difference between the first data amount obtained and the second data amount obtained, determines whether the difference calculated is within a predetermined range, and stops storing the internet states to fine resolution data storage 12 when it is determined that the difference is not within the predetermined range.

With this, according to signal collection device 10 according to the present embodiment, the internal states and the first data transfer amounts can be sampled by being electrically connected to the electronic circuit device without using any dedicated pin for probing the electronic circuit device of the measurement target. In addition, since the sampling of the internal states with a fine resolution (that is, per a first period) is caused to stop based on the data transfer amount sampled with a coarse resolution (that is, per a second period), time changes of the internal information are observed with a fine resolution (that is, in details) near the timing when an abnormality occurs in the coarse resolution data transfer amount, Therefore, a signal collection device, which can be realized with a simpler configuration than the conventional one and can obtain detailed information near the timing when an operation abnormality occurs in the measurement target system, is realized.

In addition, according to the signal collection method according to the present embodiment, a method that collects internal states, by signal collection device 10, which are indicated by signals in an electronic circuit device including a bus, the method including: a storing step (S20 to S23 in FIG. 4B) in which fine resolution data storage 12 stores the internal states in fine resolution data storage 12 by obtaining the internal states per a first period; a first data transfer amount obtaining step (S10 in FIF, 4A) in which cyclic nature determiner 15 obtains a first data transfer amount, which is a data amount transferred by the bus from cycle pattern generator 14 per a second period, which is longer than the first period; a difference calculating step (S11 in FIG. 4A) in which a second data transfer amount calculated in advance is obtained from cycle pattern generator 14, and a difference between the second data transfer amount obtained and the first data transfer amount obtained by the first data transfer amount obtaining step is calculated; and a determining step (S14 in FIG. 4A) in which it is determined whether the difference calculated in the difference calculating step is within a predetermined range and storing in the storing step is caused to stop when it is determined that the difference is not within the predetermined range.

With this, according to the signal collection method according to the present embodiment, the internal states and the first data transfer amounts can be sampled by signal collection device 10 electrically connected to the electronic circuit device without using any dedicated pin for probing the electronic circuit device of the measurement target. In addition, since the sampling of the internal states with a fine resolution (that is, per a first period) is caused to stop based on the data transfer amount sampled with a coarse resolution (that is, per a second period), time changes in the internal information are observed with a fine resolution (that is, in details) near the timing when an abnormality occurs in the coarse resolution data transfer amount. Therefore, a signal collection method by a signal collection device, which can be realized with a simpler configuration than the conventional one and can obtain detailed information near the timing when an operation abnormality occurs in the measurement target system, is realized.

In addition, when cyclic nature determiner 15 determines in the determining step that the difference is not within the predetermined range, cyclic nature determiner 15 stops storing in the storing step after the third period has elapsed from the calculation of the difference, and the third period is variable.

With this, the recording of the internal states is caused to stop after an arbitrary third period has elapsed from the timing when the abnormality that the difference between the first data transfer amount and the second data transfer amount is not within the predetermined range occurred, so that it is possible to observe detailed time changes of the internal states before and after any timing of occurrence of the operation abnormality.

In addition, fine resolution data storage 12 has a capacity for storing a predetermined amount of the internal states, and in the storing step, when the predetermined amount of the internal states is stored, the internal state is stored in the storage by overwriting the latest internal state on the oldest internal state already stored.

With this, a predetermined amount of the latest internal states is always stored in fine resolution data storage 12.

In addition, the predetermined range (margin) used by cyclic nature determiner 15 for comparing the first data transfer amount and the second data transfer amount in the determining step is variable.

With this, a margin is given to the second data transfer amount as an expected value to be compared with the first data transfer amount, and the normal/abnormal determination that absorbs the variation of the first data transfer amount that may occur within the normal range can be made.

In addition, in the determining step, cyclic nature determiner 15 generates N items of determination information, which indicate whether the difference calculated in the difference calculating step is within the predetermined range, for each of the N second periods, where N is an integer of two or more, determines whether a cycle collapse has occurred in the time change of the first data transfer amount based on the N items of determination information generated; and stops storing in the storing step when the cycle collapse is determined to have occurred.

With this, it is possible to determine whether the time change of a plurality of consecutive first data transfer amounts has cyclic nature, so that it is possible to detect an operation abnormality in an electronic circuit device including a bus in which the data transfer amount changes cyclically.

In addition, cyclic nature determiner 15 determines that the cycle collapse has occurred in the determining step when only one of the N items of determination information indicate that the difference is not within the predetermined range (that is, they mismatch).

With this, it is possible to determine that a case in which only a part of the time change in the first data transfer amount having cyclic nature is collapsed is the cycle collapse, and stop recording the internal states, so that an operation abnormality can be accurately detected.

In addition, in the determining step, cyclic nature determiner 15 does not determine that the cycle collapse has occurred when all of the N items of determination information indicate that the differences are within a predetermined range (that is, they match).

With this, when the first data transfer amount in all the aggregation intervals in the time change of the first data transfer amount forming one cycle matches the cycle pattern within a predetermined range, it is determined as normal, so that a case in which even a part is collapsed from the cycle pattern as an expected value can be detected as an abnormality.

In addition, cyclic nature determiner 15 determines that the cycle collapse has occurred in the determining step when one or more and M or less determination information among the N items of determination information indicate that the differences are not within the predetermined range (that is, they mismatch), where M is an integer of one or more and less than N−1.

With this, when the first data transfer amount in a part of the aggregation interval in the time change of the first data transfer amount forming one cycle does not match the cycle pattern within a predetermined range, it is determined as the cycle collapse, so that an erroneous determination due to a cycle shift in the comparison (that is, a phase shift in the comparison) between the first data transfer amount forming one cycle and the cycle pattern is avoided.

In addition, M described above is variable. This makes it possible to adjust the timing of comparison in order to avoid erroneous determination due to the cycle shift in the comparison (that is, the phase shift in the comparison) between the first data transfer amount forming one cycle and the cycle pattern.

In addition, the internal state stored in fine resolution data storage 12 is the amount of data transferred by the bus included in the electronic circuit device of the measurement target. With this. It is determined whether an operation abnormality has occurred at a coarse resolution for the same location (bus) in the electronic circuit device of the measurement target, and detailed (fine resolution) analysis when an operation abnormality occurs can be performed.

In addition, the electronic circuit device of the measurement target may be a one-chip semiconductor device. In that case, it is possible to analyze an operation abnormality for an LSI having a complicated operation content such as SoC.

Variation 1

Figure 5:
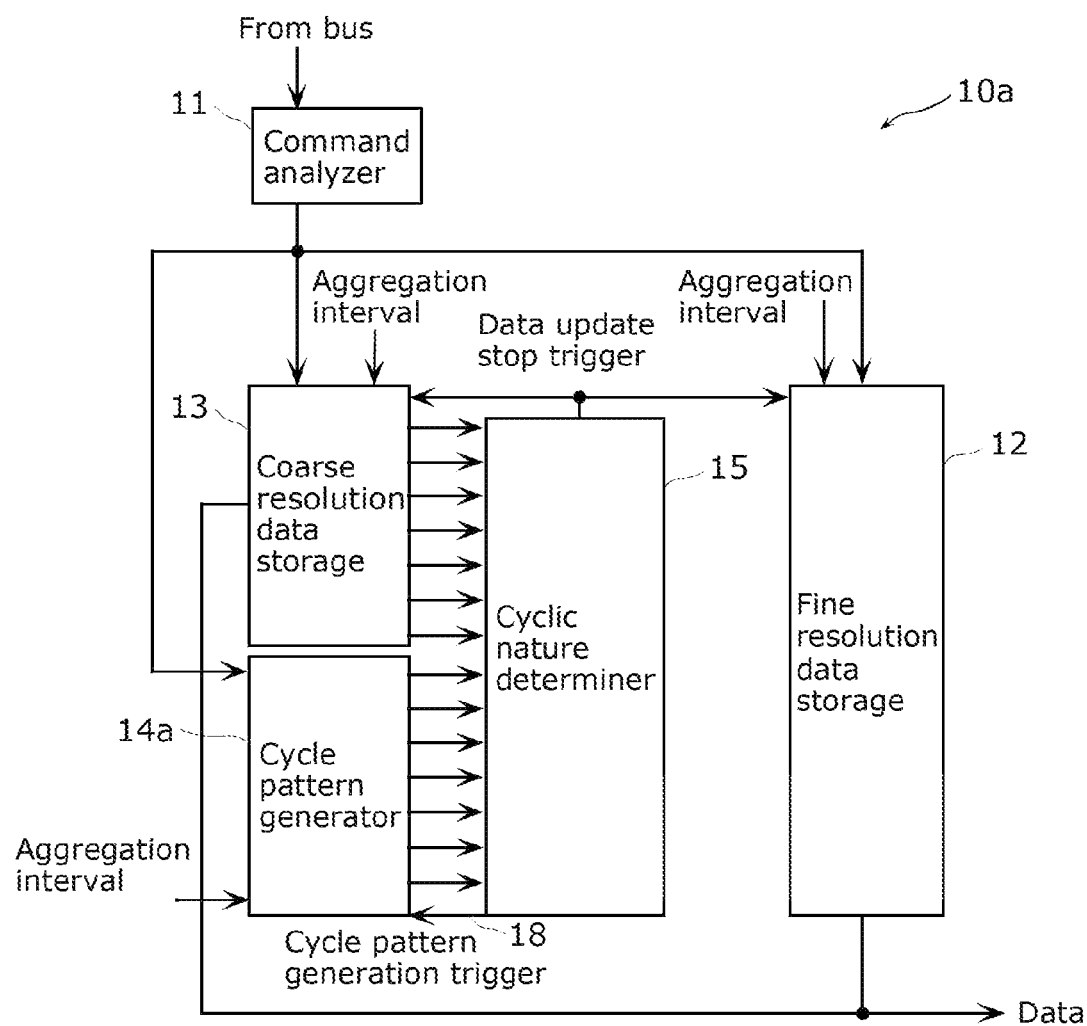
FIG. 5 is a block diagram showing a configuration of a signal collection device according to Variation 1 of the embodiment, which includes a cycle pattern generator that generates a cycle pattern using a first data transfer amount obtained in the past.

It should be noted that in the above embodiment, cycle pattern generator 14 holds an amount of the initial one cycle in the time change of the second data transfer amount (that is, N second data transfer amount) obtained when signal collection device 10 starts observing as a cycle pattern, but the method of generating the cycle pattern is not limited thereto. For example, cycle pattern generator 14 may generate a cycle pattern using one or more first data transfer amounts obtained in the past, specifically, N first data transfer amounts determined to be normal cycles, FIG. 5 is a block diagram showing a configuration of signal collection device 10a according to Variation 1 of the embodiment, which includes cycle pattern generator 14a that generates a cycle pattern using the first data transfer amount obtained in the past.

Signal collection device 10a according to the present variation basically includes the same configuration as signal collection device 10 according to the above embodiment, but it differs from the embodiment in that it includes cycle pattern generator 14a described above instead of cycle pattern generator 14 in the embodiment.

When cycle pattern generator 14a receives the cycle pattern generation trigger generated each time the normal cycle is determined from cyclic nature determiner 15 via control line 18, cycle pattern generator 14a obtains the N first data transfer amount to have been the determination target, from coarse resolution data storage 13 or cyclic nature determiner 15, combines the data transfer amounts, between the obtained N first data transfer amounts and the N second data transfer amounts already held (that is, the cycle pattern), in the corresponding aggregation intervals with each other using arbitrarily set weights, newly holds the N data transfer amounts after combining in the internal register group as a cycle pattern, and thereafter supplies it to cyclic nature determiner 15 as an expected value for comparison determination.

For example, when the weight ratio of the combination of the obtained N first data transfer amounts and the N second data transfer amounts already held is set to 1:1, cycle pattern generator 14a calculates the average value of the obtained N first data transfer amounts and the N second data transfer amounts already held for each data transfer amount in the corresponding aggregation interval, and the calculated N average values are held as a new cycle pattern (that is, N second data transfer amounts).

Alternatively, when the weight ratio of the combination of the obtained N first data transfer amounts and the N second data transfer amounts already held is set to 1:0, cycle pattern generator 14a holds the obtained N first data transfer amounts as a new cycle pattern (that is, N second data transfer amounts).

It should be noted that the method of obtaining the N first data transfer amounts determined to have a normal cycle is not only a method of obtaining from coarse resolution data storage 13 or cyclic nature determiner 15, but also cycle pattern generator 14a may perform the same processing as coarse resolution storage 13 (that is, a method of calculating and obtaining N second data transfer amounts by aggregating the data transfer amount sent from command analyzer 11 per a second period).

As described above, according to signal collection device 10a and the signal collection method according to the present variation, cycle pattern generator 14a generates the second data transfer amount to be held by using one or more first data transfer amounts obtained in the past by the first data transfer amount obtaining step.

With this, the second data transfer amount as an expected value to be compared with the first data transfer amount is replaced with the first data transfer amount obtained in the past, so that for example, by replacing with the first data transfer amount determined to be normal, the second data transfer amount as an expected value can be changed depending on the change in the state of the electronic circuit device (or the elapsed time), Variation 2

In addition, the method of generating the cycle pattern is not limited to the method of using signals in the electronic circuit device of the measurement target, and may be a method of generating the cycle pattern in an environment other than the electronic circuit device of the measurement target.

Figure 6:
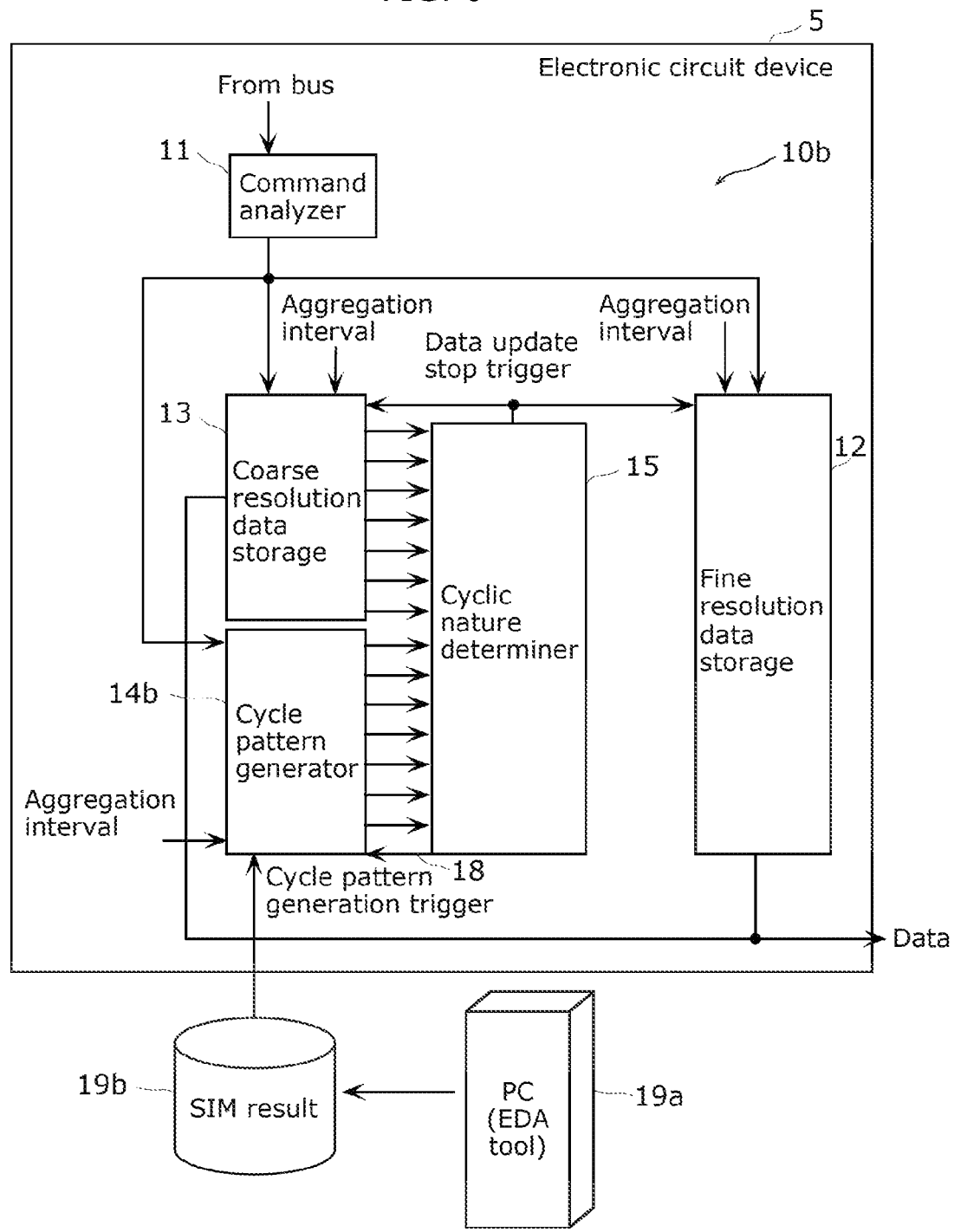
FIG. 6 is a block diagram showing a configuration of a signal collection device according to Variation 2 of the embodiment, which includes a cycle pattern generator that holds a cycle pattern generated in an environment other than the electronic circuit device of the measurement target.

FIG. 6 is a block diagram showing a configuration of signal collection device 10b according to Variation 2 of the embodiment, which includes cycle pattern generator 14b for holding a cycle pattern generated in an environment other than the electronic circuit device of the measurement target. In the present variation, signal collection device 10b is incorporated and mounted in electronic circuit device 5 of the measurement target. In addition, PC (personal computer) 19a, in which an EDA (Electronic Design Automation) tool such as a circuit simulation that supports the automation of the design of a semiconductor integrated circuit (here, the electronic circuit device of the measurement target) is implemented as an environment other than electronic circuit device 5, is also shown in this figure.

Signal collection device 10b according to the present variation basically includes the same configuration as signal collection device 10 according to the above embodiment, but it is different from the embodiment in that cycle pattern generator 14b described above is provided instead of cycle pattern generator 14 in the embodiment.

When cycle pattern generator 14b receives the cycle pattern generation trigger from cyclic nature determiner 15, cycle pattern generator 14b downloads simulation result 19b generated by the EDA tool (for example, the circuit simulation for designing electronic circuit device 5) included in PC 19a from PC 19a placed outside electronic circuit device 5 of the measurement target. Simulation result 19b is data showing a cycle pattern (that is, N second data transfer amounts) in the time change of the coarse resolution data transfer amount in the bus of electronic circuit device 5 observed by signal collection device 10b. When simulation result 19b is downloaded from PC 19a, cycle pattern generator 14b holds the cycle pattern (that is, N second data transfer amounts) indicated by downloaded simulation result 19b in the internal register group, and thereafter supplies it to cyclic nature determiner 15 as an expected value for comparison determination.

As described above, according to signal collection device 10b and the signal collection method according to the present variation, cycle pattern generator 14b generates the second data transfer amount by using the result of the simulation performed outside the electronic circuit device.

This makes it possible to verify whether the first data transfer amount that actually occurs in the electronic circuit device has the value as the result of the simulation at the design stage.

Variation 3

In addition, cyclic nature determiner 15 includes N comparators 16a to 16d (FIG. 2) in the above embodiment, but the configuration is not limited thereto.

FIG. 7 is a block diagram showing the configuration of cyclic nature determiner 15a according to Variation 3 of the embodiment (here, the configuration of the portion replacing N comparators 16a to 16d in the embodiment).

Cyclic nature determiner 15a according to the present variation includes two selectors 30a and 30b and one comparator 16 instead of N comparators 16a to 16d in the embodiment.

Selector 30a is a selection circuit that selects and outputs one in order from the N first data transfer amounts output from coarse resolution data storage 13 (that is, from the first ("coarse resolution data interval 1") to the Nth ("coarse resolution data interval N")).

Selector 30b operates in synchronization with selector 30a, and is a selection circuit that selects and outputs one in order from the Nth second data transfer amount output from cycle pattern generator 14 (that is, from the first ("cycle pattern interval 1") to the Nth "cycle pattern interval N").

Comparator 16 repeats such processing for the N sets of the first data transfer amounts and the second data transfer amounts sent from selectors 30a and 30b that comparator 16 compares one first data transfer amount selected by selector 30a with one second data transfer amount selected by selector 30b; when the difference between the first data transfer amount and the second data transfer amount is within a predetermined range (margin), it generates the determination information indicating "match" and when otherwise, it generates the determination information indicating "mismatch"; and it outputs the determination information to trigger generator 17.

As described above, according to cyclic nature determiner 15a according to the present variation, a comparison of the N first data transfer amounts with the N second data transfer amounts is performed using two selectors 30a and 30b and one comparator 16.

With this, the cyclic nature can be determined by a simple circuit of two selectors 30a and 30b and one comparator 16 instead of N comparators 16a to 16d in the above embodiment.

Variation 4

In addition, in the above embodiment, cyclic nature determiner 15 treats the N items of determination information output from N comparators 16a to 16d on an equal footing and determines the normal cycle/cycle collapse, but the normal cycle/cycle collapse may be determined after weighting the N items of determination information.

FIG. 8A is a block diagram showing the configuration of cyclic nature determiner 15b according to Variation 4 of the embodiment (here, the configuration of the portion that processes the outputs from N comparators 16a to 16d in the embodiment).

Cyclic nature determiner 15b according to the present variation includes new N weight calculators 31a to 31d which are not provided in cyclic nature determiner 15 in the embodiment and trigger generator 17a instead of trigger generator 17 in the embodiment.

N weight calculators 31a to 31d are multipliers that weight using the N weights ("weight 1" to "weight N") corresponding to the respective N items of determination information (1 (match) or 0 (mismatch)) output from respective N comparators 16a to 16d. It should be noted that N weights ("weight 1" to "weight N") are written as arbitrary values from the outside in the register group included in the electronic circuit device of the measurement target or in the register group included in signal collection device 10 or cyclic nature determiner 15b, and supplied from those register groups to N weight calculators 31a to 31d.

Trigger generator 17a calculates the sum of the weighted determination information output from N weight calculators 31a to 31d, compares the calculated sum with the preset threshold value, and determines the normal cycle/cycle collapse based on the comparison result. For example, when the sum is smaller than the first threshold, it is determined to be out of the determination target and the data update stop trigger is not output; when the sum is equal to or greater than the first threshold and is equal to or less than the second threshold (>first threshold), the cycle collapse is determined to have occurred and the data update stop trigger is output; and when the sum is larger than the second threshold value, it is determined to be a normal cycle and the data update stop trigger is not output.

Figure 8B:
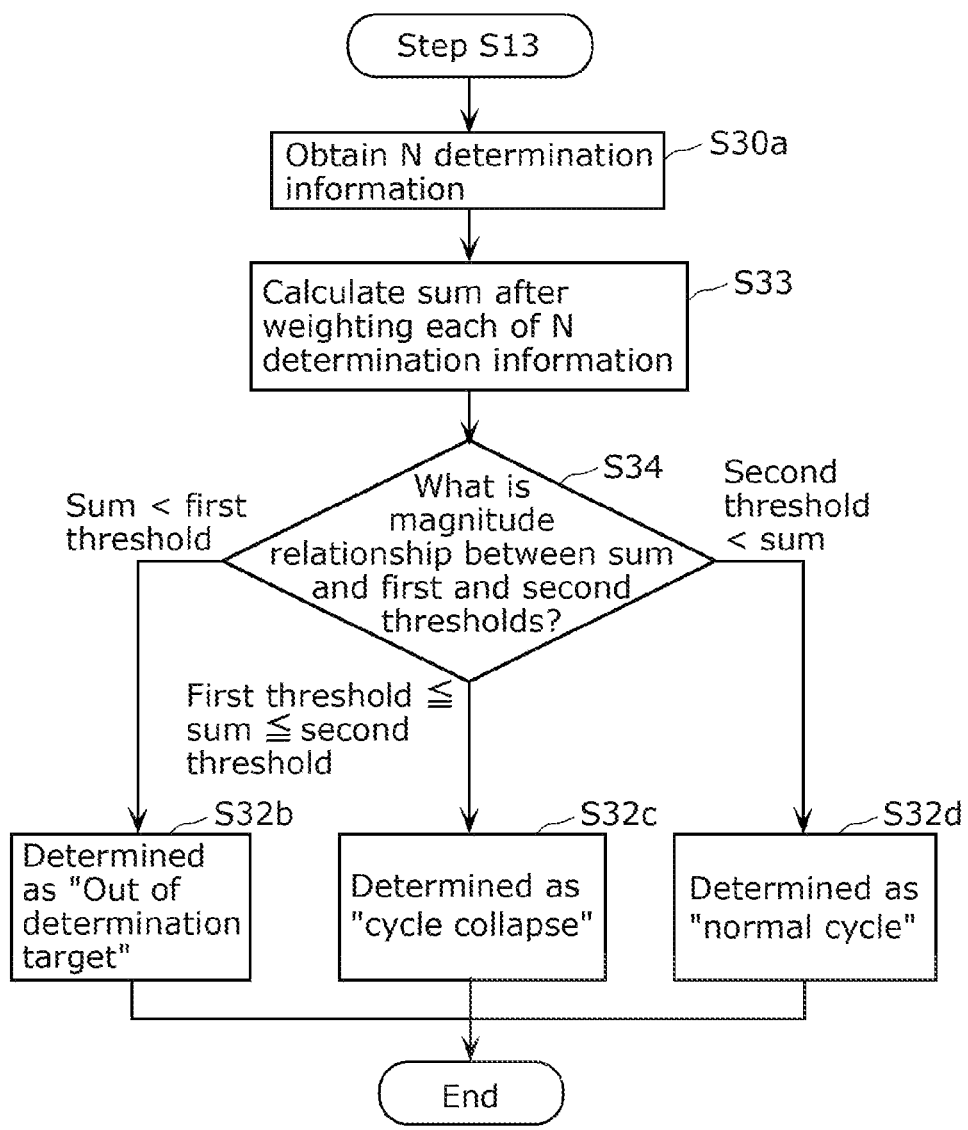
FIG. 8B is a flowchart showing an operation of the cyclic nature determiner according to Variation 4 of the embodiment.

FIG. 8B is a flowchart showing the operation of cyclic nature determiner 15b according to Variation 4 of the embodiment, and corresponds to the flowchart according to the detailed variation of step S13 (determination of "cycle collapse") in FIG. 4A.

First, in cyclic nature determiner 15b, each of N weight calculators 31a to 31d obtains determination information (a total of N items of determination information) from the corresponding one of N comparators 16a to 16d (S30a).

Then, N weight calculators 31a to 31d give corresponding weights to the obtained determination information, and subsequently, trigger generator 17a calculates the sum of the weighted determination information output from N weight calculators 31a to 31d (S33).

Then, trigger generator 17a compares the calculated sum with the preset first threshold value and the second threshold value (>first threshold value) (S34).

As a result, when the sum is smaller than the first threshold value ("sum<first threshold value" in S34), trigger generator 17a determines that it is out of the determination target and does not output the data update stop trigger (S32b); on one hand, when the sum is equal to or greater than the first threshold and equal to or less than the second threshold (>first threshold) ("first threshold ≤sum ≤second threshold" in S34), trigger generator 17a determines that the cycle collapse has occurred and outputs the data update stop trigger (S32c); and on the other hand, when the sum is greater than the second threshold value ("second threshold<sum" in S34), trigger generator 17a determines that it is a normal cycle and does not output the data update stop trigger (S32d).

FIG. 8C is a diagram showing an operation example of cyclic nature determiner 15b according to Variation 4 of the embodiment. In this figure, the histogram shows N coarse resolution data transfer amounts (that is, first data transfer amount) 27 of the comparison target. The black frame shows cycle pattern (that is, N second data transfer amounts) 24. The "comparison result" indicates N items of determination information. "Weight" indicates N weights used in weight calculators 31a to 31d. "Score" indicates N items of determination information after weighting. The total value of the "score" indicates the sum of the determination information after weighting.

In the operation example shown in this figure, N weight calculators 31a to 31d of cyclic nature determiner 15b obtain 1, 1, 0, 0, 0, 1, 1 as the determination information from comparators 16a to 16d, respectively, and by weighting with 7, 7, 1, 1, 1, 5, 5 as the corresponding weights, they generate 7, 7, 0, 0, 0, 5, 5 as the determination information after the weighting.

Trigger generator 17a calculates the sum (here, 24) of the determination information after the weighting, and the calculated sum and the preset first threshold value and the second threshold value (here, 20 as the second threshold value) are compared with each other. As a result, trigger generator 17a determines that the sum (here, 24) is larger than the second threshold value (here, 20), and determines that the N first data transfer amounts of the determination targets are normal cycles, and does not output the data update stop trigger.

As described above, according to cyclic nature determiner 15b according to the present variation, in the determining step, by calculating the sum after the corresponding weighting is applied to each of the N items of determination information, and comparing the calculated sum and the threshold value, it is determined that the cycle collapse has occurred.

With this, since it is possible to weight the comparison results in each aggregation interval that configures the cycle pattern, when the importance of the degree of matching differs for each aggregation interval, the accurate determination of the cyclic nature that reflects those importance can be made.

Although the signal collection method and the signal collection device according to the present disclosure have been described above based on the embodiment and Variations 1 to 4, the present disclosure is not limited to the embodiment and Variations. Forms obtained by making various modifications to the embodiment and variations that can be conceived by those skilled in the art, as well as other forms constructed by combining parts of structural components in the embodiment or variations, without materially departing from the spirit of the present disclosure, are also included in the scope of the present disclosure.

For example, in signal collection device 10 according to the above embodiment, although cycle pattern generator 14 holds the cycle pattern (a plurality of second data transfer amounts), and cyclic nature determiner 15 determines the cyclic nature in the time change of the first data transfer amounts with a cycle pattern as a unit, such determination of cyclic nature is not always necessary. One second data transfer amount is held in cycle pattern generator 14, one first data transfer amount and one second data transfer amount are compared in cyclic nature determiner 15, and based on the comparison result, a data update stop trigger may be generated. That is, N in the above embodiment may be 1. With this, it is determined whether each value of the first data transfer amount is a value within a predetermined range, and it is determined whether an abnormality has occurred.

In addition, in the above embodiment, cyclic nature determiner 15 outputs a data update trigger when the third period elapses from the time when it is determined that the cycle collapse has occurred, but the delay due to such a third period is not always necessary. Even if the storage in fine resolution data storage 12 is immediately stopped when the cycle collapse occurs, it is possible to observe the detailed internal states at the stage before such an operation abnormality occurs.

In addition, in the above embodiment, the "predetermined range", "M", and the number of data transfer amounts used for determining the cyclic nature are variable, but they are not necessarily variable and may be fixed values. Depending on the electronic circuit device of the measurement target, there may be a case where these parameters do not have to be changed. By setting these parameters to fixed values, the circuit scale of signal collection device 10 can be reduced.

Although only an exemplary embodiment and variations of the present disclosure have been described in detail above, those skilled in the art will readily appreciate that many modifications are possible in the exemplary embodiment and variations without materially departing from the novel teachings and advantages of the present disclosure. Accordingly, all such modifications are intended to be included within the scope of the present disclosure.

INDUSTRIAL APPLICABILITY

The present disclosure can be used as a signal collection device that collects internal states indicated by signals in an electronic circuit device including a bus, in particular, with a simple configuration, and as a signal collection device that makes it possible to obtain detailed information near the timing when an abnormality occurs in the system to be the measurement target, for example, as a signal collection circuit incorporated in a measurement target LSI such as SoC, or as a signal collection device realized separately from the measurement target system.

The invention claimed is:

1. A signal collection method that collects internal states indicated by signals in an electronic circuit device including a bus, the signal collection method comprising:
    storing the internal states in a storage by obtaining the internal states per a first period;
    per a second period, which is longer than the first period:
        obtaining a first data transfer amount, which is a data amount transferred by the bus;
        calculating a difference between a second data transfer amount and the first data transfer amount obtained in the obtaining, the second data transfer amount being calculated in advance and obtained; and
        determining whether the difference calculated in the calculating is within a predetermined range to stop storing in the storing when it is determined that the difference is not within the predetermined range.

2. The signal collection method according to claim 1, wherein in the determining, storing is caused to stop in the storing after a third period has elapsed since the difference is calculated when it is determined that the difference is not within the predetermined range, and the third period is variable.

3. The signal collection method according to claim 1,
wherein the storage has a capacity to store a predetermined amount of the internal states, and
in the storing, the internal states are stored in the storage by overwriting a latest one of the internal states on an oldest one of the internal states stored in the storage when the storage stores the predetermined amount of the internal states.

4. The signal collection method according to claim 1, wherein the predetermined range is variable.

5. The signal collection method according to claim 1,
wherein the second data transfer amount is calculated using one or more of the first data transfer amounts obtained in a past in the obtaining.

6. The signal collection method according to claim 1,
wherein the second data transfer amount is calculated by a simulation performed outside the electronic circuit device.

7. The signal collection method according to claim 1, wherein in the determining,
N items of determination information, which indicate whether the difference calculated in the calculating is within the predetermined range, are generated for each of N second periods, where N is an integer of two or more;
whether a cycle collapse has occurred in a time change of the first data transfer amount is determined based on the N items of determination information generated; and
storing is caused to stop in the storing when the cycle collapse is determined to have occurred.

8. The signal collection method according to claim 7,
wherein the cycle collapse is determined to have occurred in the determining when only one of the N items of determination information indicate that the difference is not within the predetermined range.

9. The signal collection method according to claim 7,
wherein the cycle collapse is not determined to have occurred in the determining when all of the N items of determination information indicate that the difference is within the predetermined range.

10. The signal collection method according to claim 7,
wherein the cycle collapse is determined to have occurred in the determining when one or more and M or less determination information among the N items of determination information indicate that the difference is not within the predetermined range, where M is an integer of one or more and less than N−1.

11. The signal collection method according to claim 10, wherein the M is variable.

12. The signal collection method according to claim 7,
wherein the cycle collapse is determined to have occurred in the determining by calculating a sum after weighting each of the N items of determination information correspondingly, and comparing the sum calculated with a threshold value.

13. The signal collection method according to claim 1,
wherein the internal states are data amounts transferred by the bus.

14. The signal collection method according to claim 1,
wherein the electronic circuit device is a one-chip semiconductor device.

15. A signal collection device that collects internal states indicated by signals in an electronic circuit device including a bus, the signal collection device comprising:
a fine resolution data storage that obtains and stores the internal states per a first period;
a coarse resolution data storage that stores a first data transfer amount, which is a data amount transferred by the bus per a second period, which is longer than the first period;
a pattern generator that stores the second data transfer amount calculated in advance; and
a determiner that obtains the first data transfer amount from the coarse resolution data storage, obtains the second transfer amount from the pattern generator, calculates a difference between the first data amount obtained and the second data amount obtained, determines whether the difference calculated is within a predetermined range, and stops storing the internal states to the fine resolution data storage when it is determined that the difference is not within the predetermined range.

\* \* \* \* \*